US010543618B2

(12) United States Patent
Gildersleeve et al.

(10) Patent No.: US 10,543,618 B2
(45) Date of Patent: Jan. 28, 2020

(54) PALLET FEED METHOD AND APPARATUS FOR USE ON A CONCRETE PRODUCTS MACHINE

(71) Applicant: Columbia Machine, Inc., Vancouver, WA (US)

(72) Inventors: Stacy L. Gildersleeve, Woodland, WA (US); Mani Jenabzadeh, Tualatin, OR (US); Bryan M. Bandstra, Portland, OR (US)

(73) Assignee: COLUMBIA MACHINE, INC., Vancouver, WA (US)

( * ) Notice: Subject to any disclaimer, the term of this patent is extended or adjusted under 35 U.S.C. 154(b) by 0 days.

(21) Appl. No.: 15/883,863

(22) Filed: Jan. 30, 2018

(65) Prior Publication Data

US 2019/0232525 A1 Aug. 1, 2019

(51) Int. Cl.
*B28B 15/00* (2006.01)
*B65G 47/74* (2006.01)
*B65G 15/12* (2006.01)

(52) U.S. Cl.
CPC ............ *B28B 15/005* (2013.01); *B65G 15/12* (2013.01); *B65G 47/74* (2013.01); *B65G 2203/0241* (2013.01); *B65G 2203/044* (2013.01)

(58) Field of Classification Search
CPC ...... B65G 15/10; B65G 15/105; B65G 15/12; B65G 15/20; B65G 47/74; B65G 2203/0241; B65G 2203/044; B28B 15/005
USPC ....................................................... 198/817
See application file for complete search history.

(56) References Cited

U.S. PATENT DOCUMENTS

| | | | | | |
|---|---|---|---|---|---|
| 3,779,361 | A | * | 12/1973 | Schmitt ................ | B65G 17/002 198/465.3 |
| 7,472,788 | B2 | * | 1/2009 | Bonora .................. | B65G 15/12 198/817 |
| 7,748,520 | B1 | * | 7/2010 | Helgerson ............ | B65G 13/071 198/781.03 |
| 8,033,383 | B2 | * | 10/2011 | Horn .................... | B65G 47/261 198/606 |
| 8,376,130 | B2 | * | 2/2013 | Deyanov .............. | B65G 15/105 198/817 |
| 8,439,180 | B2 | * | 5/2013 | Zhang .................. | B65G 63/025 198/369.5 |
| 8,668,078 | B2 | * | 3/2014 | Horn .................... | B65G 47/261 198/606 |

(Continued)

*Primary Examiner* — Mark A Deuble
(74) *Attorney, Agent, or Firm* — Schaffer IP Law, LLC

(57) ABSTRACT

A pallet feeder assembly for use with a concrete products machine of a type supporting a mold box within a production zone comprises a conveyor having a load/unload expanse configured to be disposed below the production zone, an upstream staging expanse upstream, and upstream and downstream ends. A plurality of sensors operative to detect a presence of a pallet on the conveyor are disposed along a length of the conveyor and include sensors disposed upstream and downstream of the load/unload expanse. Transport means on the conveyor move a pallet loaded on the transport means between the upstream and downstream ends of the conveyor. An open portion within the load/unload expanse is configured to admit a lifting means for raising the pallet from the transport means up into the production zone against an underside of a mold box during a production cycle of a concrete products machine.

10 Claims, 16 Drawing Sheets

(56) References Cited

U.S. PATENT DOCUMENTS

2002/0070102 A1* 6/2002 Kawada ............. H05K 13/0061
198/817

* cited by examiner

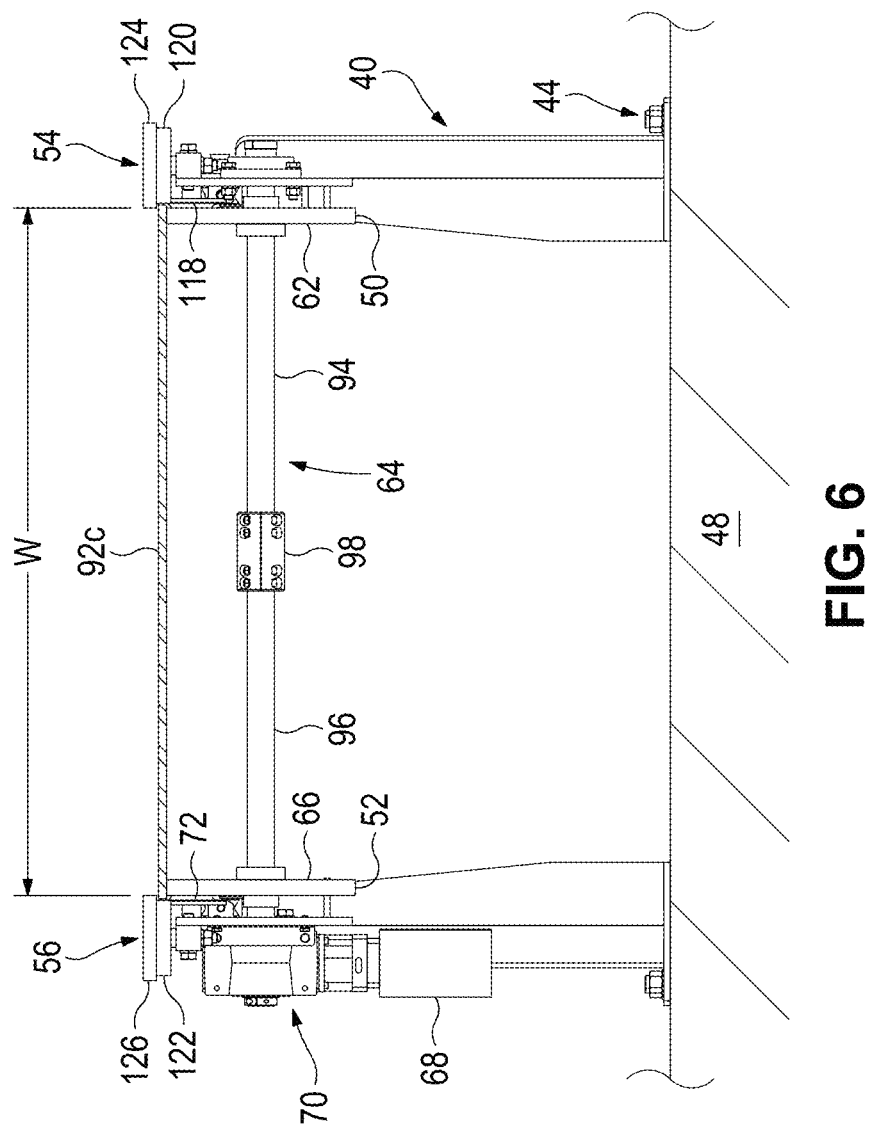

PALLET FEED METHOD AND APPARATUS FOR USE ON A CONCRETE PRODUCTS MACHINE

BACKGROUND OF THE INVENTION

1. Field of the Invention

This invention relates generally to concrete products machines (CPM) and more particularly to pallet feed conveyors and control systems used with such machines.

2. Description of the Prior Art

Concrete products machines (CPM) use production pallets in the concrete products forming process to receive and then transport the molded products output from such machines to a curing area. Once these molded concrete products are adequately cured, the production pallets transport the cured concrete products to a secondary processing and cubing area, and the production pallets are cleaned and conditioned before being returned back to the CPM to begin the cycle anew.

Prior art machines for forming concrete products within a mold assembly include a product forming section comprising a stationary frame, an upper compression beam and a lower stripper beam. The mold assembly includes a head assembly that is mounted on the compression beam, and a mold box that is mounted on the frame and receives concrete material from a feed drawer. An example of such a system is shown in U.S. Pat. No. 5,807,591 which describes an improved concrete products forming machine (CPM) assigned in common to the assignee of the present application and herein incorporated by reference for all purposes.

The cavities of the mold box are typically open at both the top—for receiving the concrete—and at the bottom—for ejecting the molded product therefrom. To retain the concrete within the cavities during the molding process, therefore, a pallet (typically a metal plate) is moved up against the underside of the mold box. After molding is complete, the molded product is typically pushed out of the mold cavities onto the pallet as the pallet is separated from the underside of the mold box and is transported on the pallet away from the CPM.

An important part of this production process is how efficiently these production pallets are moved into position to properly receive and carry away the molded concrete products from the CPM. Delays in moving the production pallet into a load position beneath the mold box slow the entire production process down. Furthermore, the pallets must be accurately positioned to receive the molded product, but this can be complicated by slippage of the pallet on the conveyors due to oily surfaces. Finally, the speed at which the pallets are fed to and from the CPM can be important to avoid collisions with adjacent pallets on the production line or damage to the just-formed molded products as they are carried away from the CPM to the cubing station.

Conventional methods and systems for feeding pallets to CPMs within the concrete products industry use complex mechanical methods for moving and positioning pallets, including the use of pusher dogs, walking beams, and shuttle or chain conveyors. Because of this complexity, the resulting wear on these mechanical components has been found to adversely affect the performance of the pallet feeder assembly over the long term and lack the flexibility, accuracy, and control to adequately overcome some or all of the disadvantages noted above.

Accordingly, there is need for an improved system and method for better automating the process for conveying pallets to and from a concrete products machine that minimizes these drawbacks.

SUMMARY OF THE INVENTION

The present invention deals with the process of receiving an empty production pallet and moving that pallet to a position under the mold assembly in the concrete products machine (CPM). The production pallet is raised up to the bottom of the mold assembly by the CPM and a series of concrete products are formed within the mold assembly and on the production pallet. The pallet is then lowered down to the pallet feeder assembly with the newly formed concrete products supported by the production pallet. The now-full production pallet is then transferred with the concrete products forward and out of the CPM onto a receiving conveyor. During the process of forming the concrete products on the production pallet, another production pallet will be moved through the pallet feeder assembly and staged behind the mold assembly ready for the next machine cycle.

A unique feature of this invention is the simplicity of design used to move production pallets through a CPM. The invention uses servo-driven belt conveyors to move and position production pallets in the machine. This significantly reduces the cost of the pallet feeder assembly, thus making the CPM more competitive and reducing maintenance costs of operating the pallet feeder assembly through reduction of wear parts in the design. Other resulting advantages of this design is that the pallet positioning is extremely accurate and repeatable independent of mechanical component wear.

As implemented, the invention results in a pallet feeder assembly for use with a concrete products machine of a type supporting a mold box within a production zone comprising a conveyor having a load/unload expanse configured to be disposed below the production zone, an upstream staging expanse upstream, and upstream and downstream ends. A plurality of sensors operative to detect a presence of a pallet on the conveyor are disposed along a length of the conveyor and include sensors disposed upstream and downstream of the load/unload expanse. Transport means on the conveyor move a pallet loaded on the transport means between the upstream and downstream ends of the conveyor. An open portion within the load/unload expanse is configured to admit a lifting means for raising the pallet from the transport means up into the production zone against an underside of a mold box during a production cycle of the concrete products machine.

The invention additionally describes a method for correcting pallet position on a conveyor of a type having a pallet length between an upstream and downstream end and a load/unload expanse within which the pallet is properly positioned for use in a molded products production cycle. The method comprises disposing sensors immediately upstream and downstream of the load/unload expanse, where each of the sensors are configured to detect the presence of the pallet immediately adjacent the sensor. After stop of the pallet on the conveyor, the method proceeds to detect whether the pallet is immediately adjacent one of the sensors and, if the pallet is immediately adjacent one of the sensors, automatically operating a position correction operation on the conveyor such that the pallet is moved so that it is no longer immediately adjacent to any of the sensors. In a preferred implementation of this position correction operation, the method calculates a difference between a length of the pallet and a distance between the upstream and downstream sensors and sends instructions to the conveyor to move the pallet half the calculated difference downstream if the sensor detected to be immediately adjacent the pallet is an upstream sensor, otherwise sending instructions to the conveyor to move the pallet half the calculated difference upstream if the covered sensor is a downstream sensor.

The invention further details a method for moving pallets on a conveyor between upstream and downstream ends using one of a plurality of selectable motion profiles. The method comprises allowing selection of one of a plurality of displayed motion profiles by a machine operator, where each of the plurality of motion profiles are preset to include at least an operation speed, a deceleration rate, an acceleration rate, and (optionally) a jerk rate. The process then proceeds by implementing the selected one of the plurality of motion profiles on a pallet conveyor of a type including a servo motor for moving belts on the conveyor that are operative to support and transport a pallet thereon. The process of implementing the selected motion profile includes the steps of accelerating the servo motor up to the acceleration rate by the jerk rate until the motor achieves the preset operation speed of the selected motion profile such that the pallet on the conveyor moves at or near that rate and speed. Then, responsive to a detected position of the pallet on the conveyor, the process continues by automatically decelerating the servo motor up to the deceleration rate by the jerk rate until the operating speed of the motor decelerates down to zero so that the pallet stops on the conveyor at or near a desired position.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 5 is a plan view of the in-feed section of the pallet feeder assembly of FIG. 1 showing an unaligned pallet being fed through.

FIG. 6 is an end elevation view of the in-feed section of FIG. 5 taken along lines 6-6.

DETAILED DESCRIPTION

Figure 1:
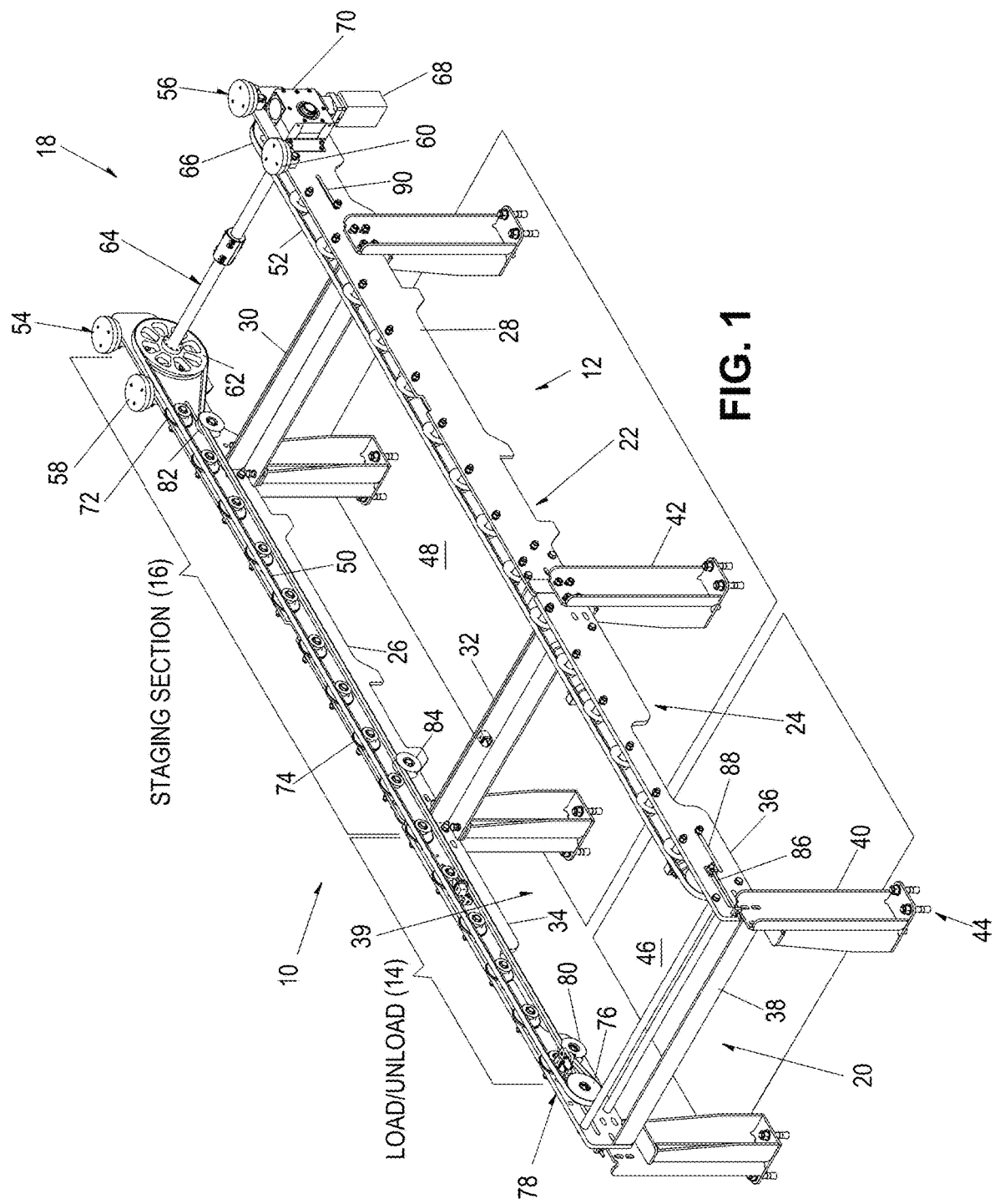
FIG. 1 is a perspective view of a concrete products machine pallet feeder assembly as implemented according to a preferred embodiment of the invention.

As implemented, the invention results in a pallet feeder assembly for use with a concrete products machine of a type supporting a mold box within a production zone comprising a conveyor having a load/unload expanse configured to be disposed below the production zone, an upstream staging expanse upstream, and upstream and downstream ends. A plurality of sensors operative to detect a presence of a pallet on the conveyor are disposed along a length of the conveyor and include sensors disposed upstream and downstream of the load/unload expanse. Transport means on the conveyor move a pallet loaded on the transport means between the upstream and downstream ends of the conveyor. An open portion within the load/unload expanse is configured to admit a lifting means for raising the pallet from the transport means up into the production zone against an underside of a mold box during a production cycle of a concrete products machine.

This setup has several advantages. First, the pallet feed has been changed from a pusher dog system to a simpler power train belt type conveyor with the novelty being the use of a single servo motor and single proximity switch that can provide the required speeds, accelerations, and positions for the entire pallet feed function. The single switch design can determine not only specific pallet placement but pallet size as well, allowing for a whole host of pallet feed diagnostics and alarms.

Furthermore, the invention achieves greater accuracy with pallet positioning. That is, the inventive method uses a means of conveyance, an encoder feedback device on the conveyor indicating a position of the belt, and a switch to indicate a trailing edge of the pallet being positioned that allows a pallet to be positioned to a very great degree of accuracy without the use of a physical stop or pushing device.

Yet another advantage of the invention is with pallet feed buffering whereby the method of feeding pallets allows the machine to maintain a desired cycle rate regardless of the position of the pallet in the machine, all the way from a furthest back position (outside) at the infeed of the machine up to a near staged position just behind the product making position.

Additionally, the inventive apparatus and methods provide pallet position compensating. This method allows a user to select a predetermined mode of operation to alert the user or automatically reposition a pallet. Possible options are (1) Alert operator of incorrect pallet position and pause operation, and (2) Alert operator of incorrect pallet position and move pallet in a predetermined manner to get pallet in correct position to continue operation.

Finally, the inventive apparatus and method enables the use of multiple selectable pallet motion profiles. In this method, a user is allowed to select several modes to control pallet motion to reduce positioning error due to physical conditions of the pallet and/or requirements of the product being made on the pallet. Examples include: (1) an "Oily Pallet Mode" that changes the pallet feed conveyor motion profile for acceleration, deceleration, and speed to reduce pallet slippage on the conveyor, and (2) a "Delicate Product Mode" that changes the pallet feed conveyor motion profile for acceleration, deceleration, and speed to reduce product damage.

FIG. 1 illustrates a pallet feeder assembly 10 as configured according to an embodiment of the invention. The assembly 10 includes a conveyor 12 having a pallet load/unload expanse 14 and a pallet staging expanse 16 disposed upstream of the load/unload expanse. The conveyor 12 is operative to move pallets received at an upstream end 18 to a downstream end 20 according to processes and move profiles described further below.

Pallet feeder assembly 10 is structured with a frame formed of two sets of horizontal weldments, including an upstream weldment 22 forming the staging section 16 of the conveyor 12 and a downstream weldment 24 forming the load/unload section 14 of the conveyor 12. Upstream weldment 22 is formed with right and left side plates 26, 28 coupled together using a pair of L-shaped frame spreaders or cross-beam members 30, 32 near upstream and downstream ends of the weldment 24. The downstream weldment 24 is similarly structured to the upstream weldment 22, except with shorter right and left side plates 34, 36 axially coupled to respective right and left side plates 26, 28 of upstream weldment 22, with side plates 34, 36 coupled together using spreaders 32, 38 extending laterally across a width of the conveyor 12. The structure of the downstream weldment 24 with side plates 34, 36 and cross-beam members 32, 38 creates an open portion 39 within the load/unload expanse 14 that is configured to admit a lifting means—such as a CPM stripper beam 310 (FIG. 2)—for raising a pallet 92 from the conveyor surface up against an underside of a mold box and back down onto the conveyor during a production process of the CPM as described further below.

Figure 4:
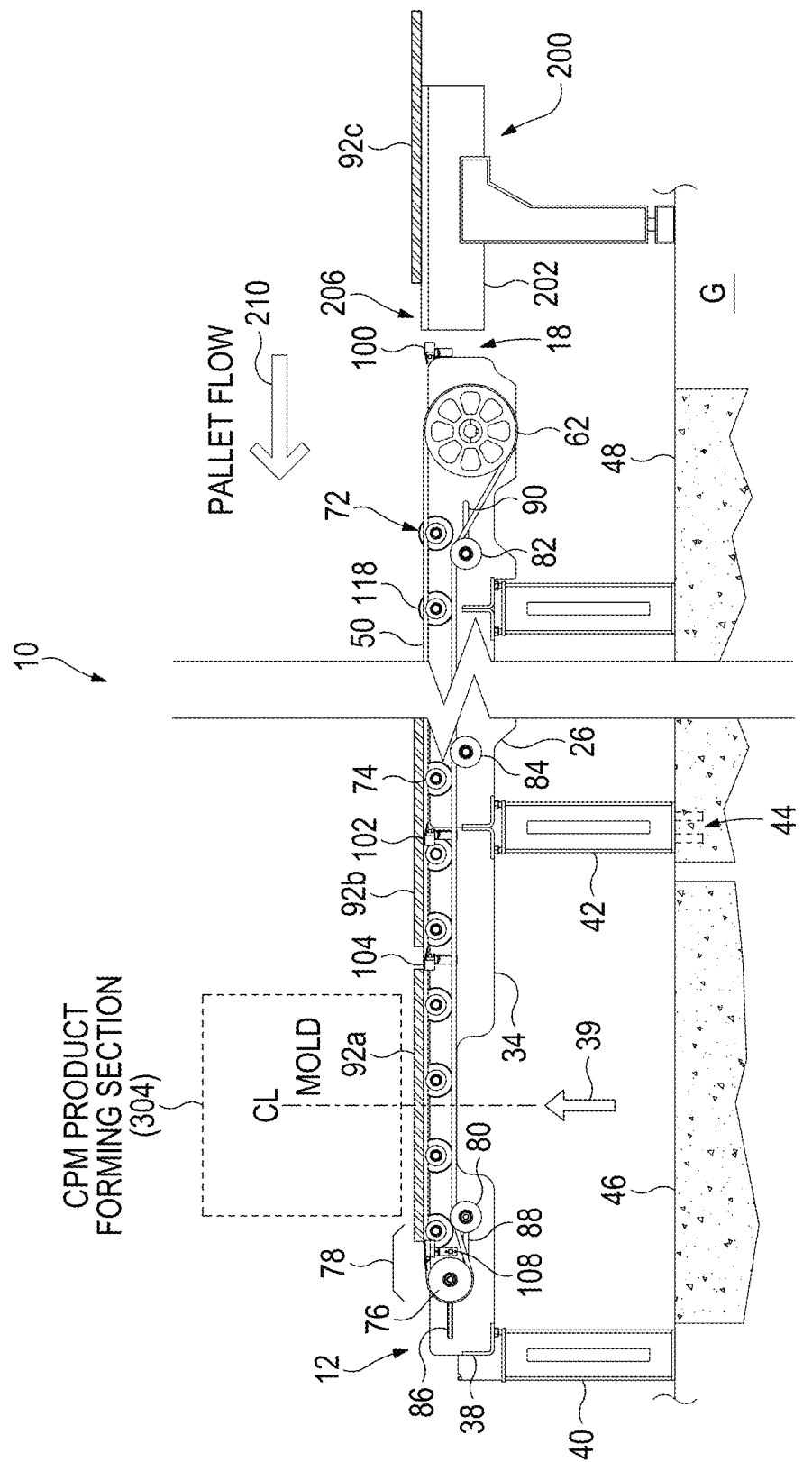
FIG. 4 is a sectioned side elevation view of the pallet feeder assembly taken along lines 4-4 from FIG. 3.

A plurality of conveyor supports such as legs 40, 42 are bolted to the side plates of the weldments, such as leg 40 bolted to side plate 36 and leg 42 is bolted to and coupling together side plates 28 and 36. The legs 40, 42 each include a set of anchor bolts 44 that extend through base plates of the legs and anchor the legs and thus the conveyor 12 itself to the ground. As will be explained in more detail below, the center processing section of a concrete products machine 300 (FIG. 2) is disposed upon its own concrete foundation pad 46, which is separated from feed drawer section concrete pad 48 so as to isolate vibrations that can occur between the sections. The legs of the pallet feeder assembly, and particularly legs 40, 42 of the rear upstream section, are anchored into concrete pad 48 whereas the legs 40 of the downstream section of the conveyor 12 are anchored into the shop floor G (FIG. 4). In this way, the conveyor 12 spans across, but is not anchored to, the concrete pad 46 supporting the production section of the CPM 300 and is thus vibrationally isolated from it. By being vibrationally isolated from the CPM, pallets on the conveyor are less prone to slippage and thus more positional accuracy on the conveyor can be achieved.

Pallet alignment means are positioned at the upstream end 18 of conveyor 12 to properly align pallets received from in-feed conveyor 200 (FIG. 3) so that the pallets are square to the conveyor and extend fully across its width so as to by supported fully on conveyor belts 50, 52. As implemented according to a preferred embodiment, the pallet alignment means include an upstream set of guide wheels 54, 56 and a downstream set of such wheels 58, 60 that will be further described below with reference to FIGS. 5 and 6.

Each of the sides of the conveyor are a mirror to the other with similar belts, sheaves, and guides. Belt 50 runs along a conveyor assembly affixed on an inside wall of plates 26, 34 forming the left side of conveyor 12 (as viewed upstream from a downstream end). Similarly, belt 52 runs along a conveyor assembly affixed on an inside wall of plates 28, 36 forming the right side of conveyor 12. Belt 50 passes over a drive sheave 62 that is mechanically coupled via drive shaft 64 to left-side drive sheave 66. A motor 68 connects with a gear box 70 that drives sheave 66 and, by connection, sheave 62 and provide motive force to move the belts 50, 52. Motor 68 is operated via electrical connections shown in FIG. 13 to turn drive shaft 64 at a certain speed via gear box 70 as determined by control means described further below.

Belt 50 passes around sheave 62 and is carried along the top of conveyor on a linear array of belt guides 72, 74, each having a groove in which the belt is retained and having a guide flange that extends upward adjacent the side plates 26, 34 for rolling contact with the pallet as the pallet is carried on the belts past the belt guides. Belt guides 72, 74 have annular guide flanges on only one side of their central annular groove depending upon whether the belt guide is located along the right or left side of the conveyor 12. That is, whereas belt guides 72, 74 have raised annular flanges located on right sides of the guides adjacent to side plates 26, 34 when looking downstream along the traveling length of the conveyor 12, the belt guides located on the left sides of the conveyor have raised annular flanges located on the left side adjacent side plates 28, 36. The belt 50 continues over the linear array of belt guides to a downstream end 20 of the conveyor 12 whereupon the belt 50 passes over a tensioning sheave 76 that acts to return the belt to an upstream end 18 thereof. While the top of drive sheave 62 is horizontally aligned with the supporting surfaces of belt guides 72, 74, the top surface of tensioning sheave 76 is disposed lower so as to define a take-off area 78 upon which the pallet is no longer in contact with the belts, 50 52. Double flanged lower belt guides or idler sheaves 80, 82, 84 then direct the belt upstream back to drive sheave 62 so that the loop of belt 50 is complete. Tensioning sheave 76, and idler sheaves 80 and 82 are each coupled to respective tensioning slots 86, 88, 90 along their axes thereof so that the sheaves may be moved longitudinally along the slot and thus take up slack in the belt 50 to adjust its tension.

The pallet feeder assembly 10 is preferably used in connection with a concrete products machine 300 such as described below, however conveyor 10 can be used for any machine where pallets are required to receive and then carry off products for curing and/or palletizing. An example of such a system is shown in U.S. Pat. No. 5,807,591 which describes an improved concrete products forming machine (CPM) assigned in common to the assignee of the present application and herein incorporated by reference for all purposes.

Figure 2:
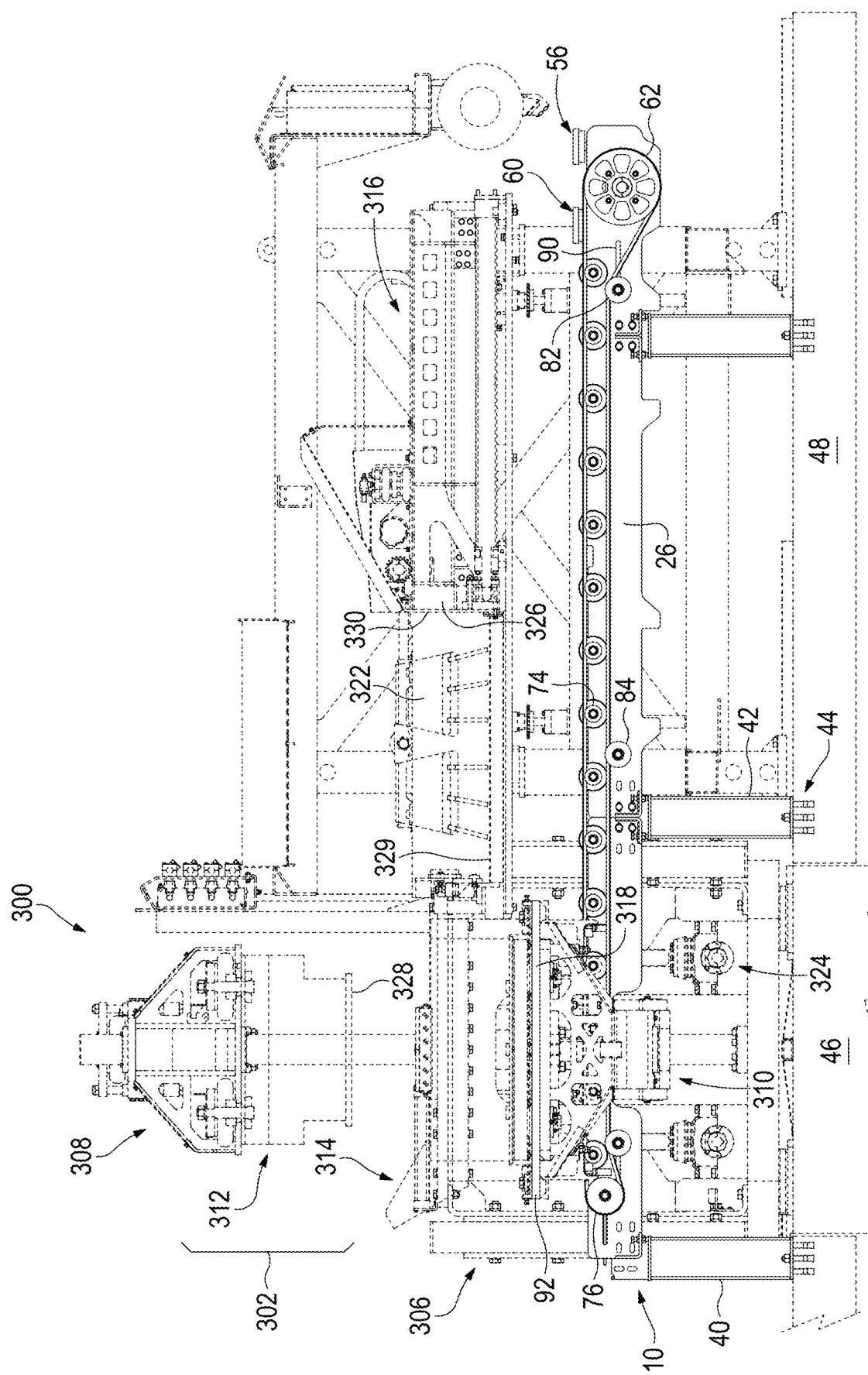
FIG. 2 is a side elevation of the pallet feeder assembly of FIG. 1 in section with a concrete products machine shown in shadow lines.

FIG. 2 illustrates in dashed lines a machine 300 for forming concrete products within a mold assembly 302 and includes a product forming section 304 (FIG. 4) comprising a stationary frame 306, an upper compression beam 308 and a lower stripper beam 310. The mold assembly 302 includes a head assembly 312 that is mounted on the compression beam 308, and a mold box 314 that is mounted on the frame 306, and receives concrete material from a feed drawer 316. FIG. 2 is illustrated with the machine 300 and conveyor assembly 10 in the middle of a production cycle with the stripper beam 310 raised up through an opening 39 within the conveyor assembly 10 and lifting a production pallet 92 up against an underside 318 of the mold box 314.

The cavities of the mold box are typically open at both the top—for receiving the concrete—and at the bottom—for ejecting the molded product therefrom. To retain the concrete within the cavities during the molding process, therefore, a pallet 92 (typically a metal plate) is moved up against the underside 318 of the mold box 314. After molding is complete, and as described in more detail below, the molded product is typically pushed out of the mold cavities onto the pallet 92 as the pallet is separated from the underside 318 of the mold box 314 and is transported on the pallet away from the CPM 300.

In use, the feed drawer 316 moves concrete material over the top of the mold box 314 and dispenses the material into the contoured cavities of the mold box. The feed drawer 316 typically includes an agitator assembly 322 within the drawer that operates to break up the concrete and improve its consistency prior to dropping it into the mold 314. As the concrete material is dispensed, a vibration system 324 shakes the mold box 314 to spread the concrete material evenly within the mold box cavities in order to produce a more homogeneous concrete product. A wiper assembly 326, mounted to the front of the feed drawer 316, acts to scrape excess concrete from the shoes 328 when the feed drawer 316 is moved to an operative position above the mold box 314 along track 329.

After the concrete is dispensed into the mold cavities, the feed drawer 316 retracts from over the top of the mold box 314 along the track 329. A spreader 330, bolted separately to the front of the feed drawer 316, scrapes off excess concrete from the top of the mold when the feed drawer is retracted after filling the mold cavities. The compression beam 308 then lowers, pushing shoes 328 from the head assembly 312 into corresponding cavities in the mold box. The shoes 328 compress the concrete material during the vibration process. After compression is complete, the stripper beam 310 lowers as the head assembly 312 pushes further into the cavities against the molded material. A molded concrete product thereby emerges from the bottom of the mold box 314 onto the pallet 92 and is conveyed away for curing, and a new pallet (e.g. staged pallet 92b shown in FIG. 3) moved in its place into the load/unload area 14 below product forming section 304 (FIG. 4) and then lifted by the stripper beam 310 against the underside 318 of the mold assembly 314 to start a new cycle.

Figure 3:
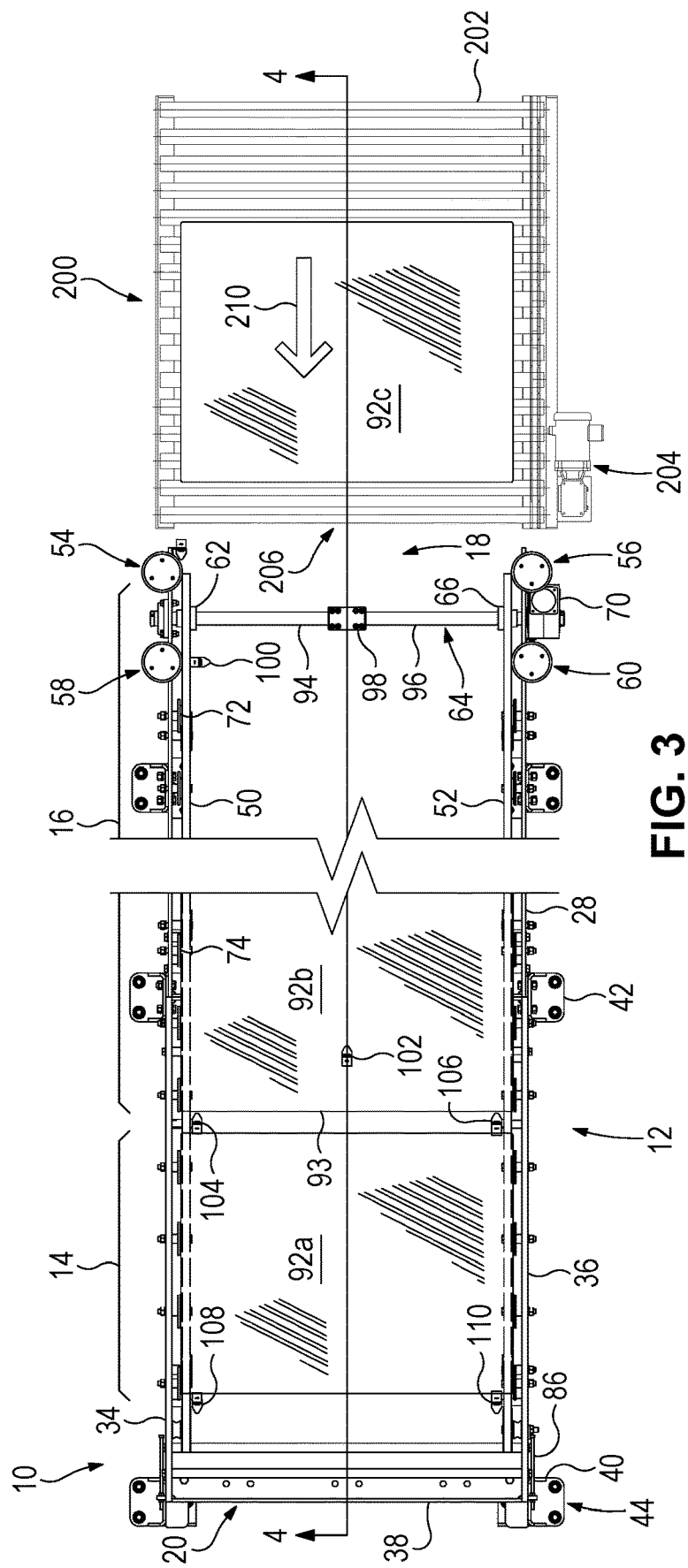
FIG. 3 is a plan view of the pallet feeder assembly of FIG. 1 broken along a portion of the staging section of the assembly.

FIG. 3 shows a plan view of the pallet feeder assembly 10 of FIG. 1. An in-feed conveyor 200 is shown in broken lines spaced from an upstream end 18 of conveyor 12. The spacing of the infeed conveyor behind the alignment wheels can be variable, where preferably a 2" to 6" spacing will work for most pallets 92 being conveyed. In-feed conveyor 200 is shown with rollers 202 that contact the underside of pallet 92c and turn under power of motor 204 to move pallet 92c toward the upstream end 18 of conveyor 12 along arrow 210. A sensor (not shown) at the downstream end 206 of in-feed conveyor 200 can be used to detect pallets 92 as they are being supplied to the pallet feeder assembly 10. Alternately, or in addition, an in-feed sensor 100 can be mounted at the upstream end 18 of conveyor 12 to detect a pallet 92 entering onto the conveyor belts.

A plurality of sensors are disposed along a length of the conveyor 12, including a stage-begin sensor 100 positioned adjacent the upstream end 18 of the conveyor 12 and configured to detect a leading edge of a pallet, e.g. of pallet 92c, moved onto conveyor 12. The conveyor 12 is controllable by means described further below to operate the motor 68 (FIG. 1) and gearbox 70 to turn drive shaft 64, which is axially coupled to drive sheaves 62, 66. Drive shaft 64 is preferably constructed using two separate shaft sections 94, 96 that are coupled together via a coupling 98. The ends of the shaft sections 94, 96 retained within coupling 98 are spaced apart approximately an inch so that one or both of shaft sections 94, 96 can be separately decoupled from a respective drive sheave 62, 66 for repair or replacement without needing to disassemble the sheaves as well (see FIG. 5).

Conveyor 12 further includes a stage-end sensor 102 downstream of sensor 100 and centrally located between belts 50, 52 on the conveyor 12, and two pairs of load/unload sensors—one pair (sensors 104, 106) defining an upstream end of the load/unload zone 14, and the other pair (sensors 108, 110) defining the downstream end of the load/unload zone 14. Sensors 104, 108 are mounted on the side plate 34 of conveyor assembly 10 adjacent belt 50 on the left side of conveyor 12, and sensors 106, 110 are mounted on the opposite side plate 36 adjacent belt 52 on the right side of the conveyor. As will be described in more detail below, stage sensor 102 detects a leading edge 93 of staged pallet 92b and controls operation of motor 68 according to a selected motion profile to stop the staged pallet 92b a predetermined distance downstream from sensor 102.

Figure 13:
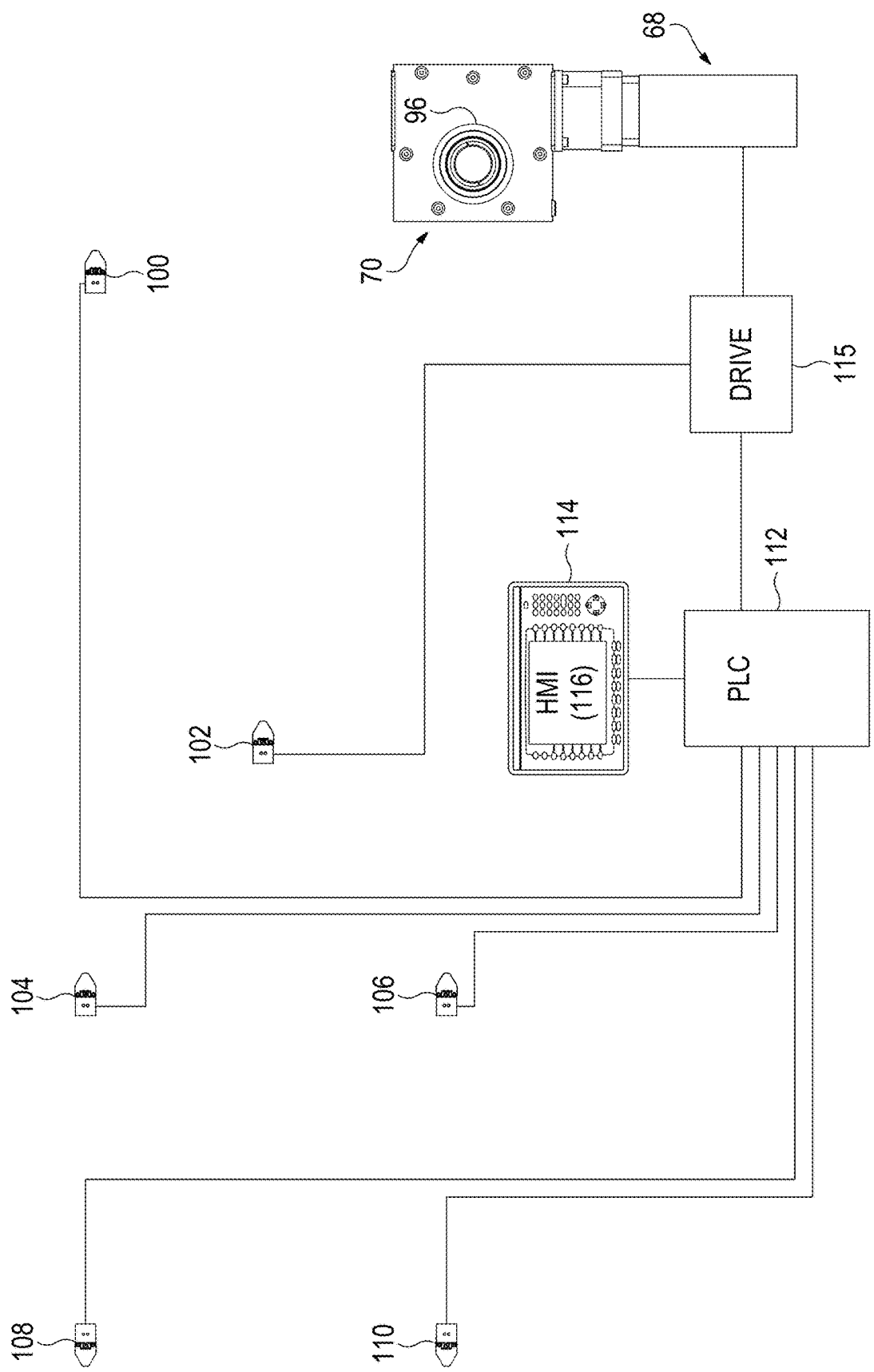
FIG. 13 is a schematic diagram showing the electrical connections between sensors, controllers, and motors in the pallet feeder assembly of FIG. 1.

The pallet feeder assembly 10 includes a plurality of sensors arrayed along a pallet's path of movement down the conveyor 12, including sensors adjacent to each of the pair of spaced belts 50, 52. As configured according to the present invention, there are six proximity switches or sensors 100, 102, 104, 106, 108, 110 used on the pallet feeder assembly 10. Each of these proximity switches has two sets of contacts: normally open and normally closed. Four of these switches are spaced around the production pallet 92a located in the load/unload zone 14 and centered below mold 314 position within product forming section 304. These four sensors—e.g. sensors 104, 106 108, and 110—are wired to use both contacts while the other two upstream proximity switches—e.g. sensors 100, 102—only use the normally open contacts. All proximity switches are wired to the input/output of PLC 112 (FIG. 13) with the exception of stage sensor 102, which is wired directly to drive 115 (FIG. 13). Controller 114 is operative to store motion profiles therein and to operate motor 68 as discussed further below, and includes a display 116 for allowing operator selection of one of the stored motion profiles.

FIG. 4 is a side elevation view of the pallet feeder assembly 10 sectioned along line 4-4 in FIG. 3 and showing the left side of conveyor 12. Three pallets are shown in various positions along pallet flow 210. Pallet 92c is located on in-feed conveyor 200 and ready to be transferred onto the belts 50, 52 of conveyor 12 for transport downstream to staging section 16 and thence to load/unload area 14. The downstream end 206 of in-feed conveyor 200 and upstream end 18 of conveyor 12 are spaced apart and anchored to different sections of the floor—in-feed conveyor to ground G and the conveyor 12 anchored via bolts 44 to concrete pad 48. Left side belt 50 makes a loop around drive sheave 62 and downstream over belt guides, such as guides 72, 74, to form a support surface for pallets such as staged pallet 92b and production pallet 92a. The belt then loops around tensioning sheave 76 at its downstream end and passes back upstream over idler sheaves 80, 82, and 84 before completing the loop back to drive sheave 62. Rotation of drive shaft 94 within the axis of drive sheave 62 rotates the drive sheave and moves belt 50 along the other guides and sheaves as previously noted. Tension on the belt 50 can be maintained by moving various sheaves 76, 80, and 82 along respective slots 86, 88, and 90. Movement of idler sheave 80 downstream along slot 88, and idler sheave 82 upstream along slot 90, further increases the area of contact with the belt 50 and can decrease slippage between the belt and sheave. Movement of tensioning sheave 76 along slot 86 can also extend the length of the take-off area 78 so that contact of the production plate 92a as it is carried on belt 50 downstream is more gradually released as the slope of the downward slope of the take-off area is made shallower.

And as will be appreciated, the belt 50 is has a V-shaped cross section that fits within complementary grooves of the sheaves and is formed with polyester cords. Belts 50, 52 are formed with some resiliency, which acts as a shock absorber when a fully loaded production pallet 92a is lowered back down onto the belts 50, 52 after receiving the molded product. This has an advantage over rigid conveyor means such as steel rollers where the shock of lowering the loaded production pallet onto the conveyor could potentially damage the molded, uncured product.

Each of the guides 72, 74 includes an annular flange 118 on an outside edge thereof that extends upward past belt 50. For guides located on the right side of conveyor 12, these flanges are located adjacent sidewall plates 26, 34 of the conveyor frame. Movement of the belt 50 along guides 72, 74 causes the guides to rotate, which in turn causes the guide flanges 118 to rotate. The distance between guide flanges on opposite sides of the conveyor 12 closely matches the width W of pallets 92a, 92b so that any contact between the side edges 124, 126 of pallets 92a, 92b and the rotating surfaces of the flanges 118 help push the pallet forward (or backward, if the motor causes the drive sheaves to rotate in the reverse direction) on the conveyor.

Figure 5:
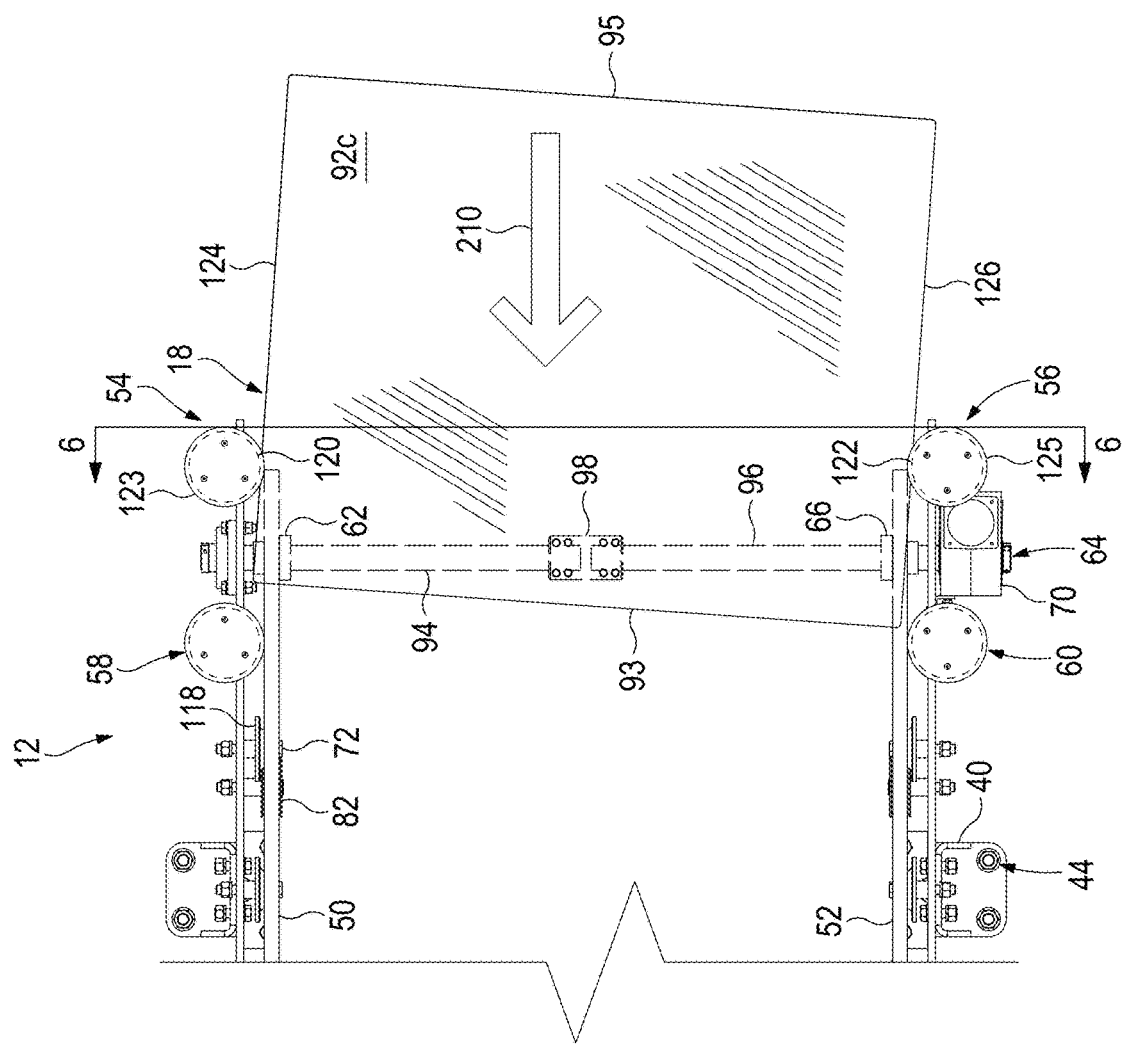

FIGS. 5 and 6 illustrate magnified views of the upstream end 108 of the conveyor 12 and, in particular, the means for aligning the pallet 92c as it is received from in-feed conveyor 200 (FIG. 3). FIG. 5 shows pallet 92c coming off in-feed conveyor 200 in a non-aligned position so that it is not square with conveyor 12. A pallet alignment mean is disposed adjacent the upstream end 18 of the conveyor and includes guide wheels 54, 56 disposed on either side of the conveyor with rolling contact surfaces 120, 122 that are separated apart approximately a width W of pallet 92c. Side edges 124, 126 of pallet 92c contact both rolling surfaces 120, 122 as the pallet passes between the upstream guide wheels 54, 56. The rolling contact surfaces 120, 122 have an approximate height that is slightly greater than that of the pallet side edges 124, 126 for reasons that will be apparent below. Guide wheels 54, 56 further include upper surfaces 123, 125 that are stacked on and have a larger diameter than the rolling contact surfaces 120, 122 so as to act as a gauge that disallows stacked pallets from passing through to the conveyor 12, but instead allows a bottom one of the pallets to pass through between surfaces 120, 122 while preventing a top pallet laying on the bottom one from moving through. In this way, the alignment means only allows one pallet at a time onto the conveyor belts 50, 52.

To further align the pallet 92c onto conveyor, the alignment means includes a downstream set of guide wheels 58, 60 that are structured similarly to guide wheels 54, 56. As the insides of the contact surfaces on wheels 54 and 58 are aligned parallel with belt 50, and the insides of contact surfaces on wheels 56 and 60 with belt 52, the pallet 92c can be fully aligned with the direction of travel on the conveyor 12.

Figure 7A:
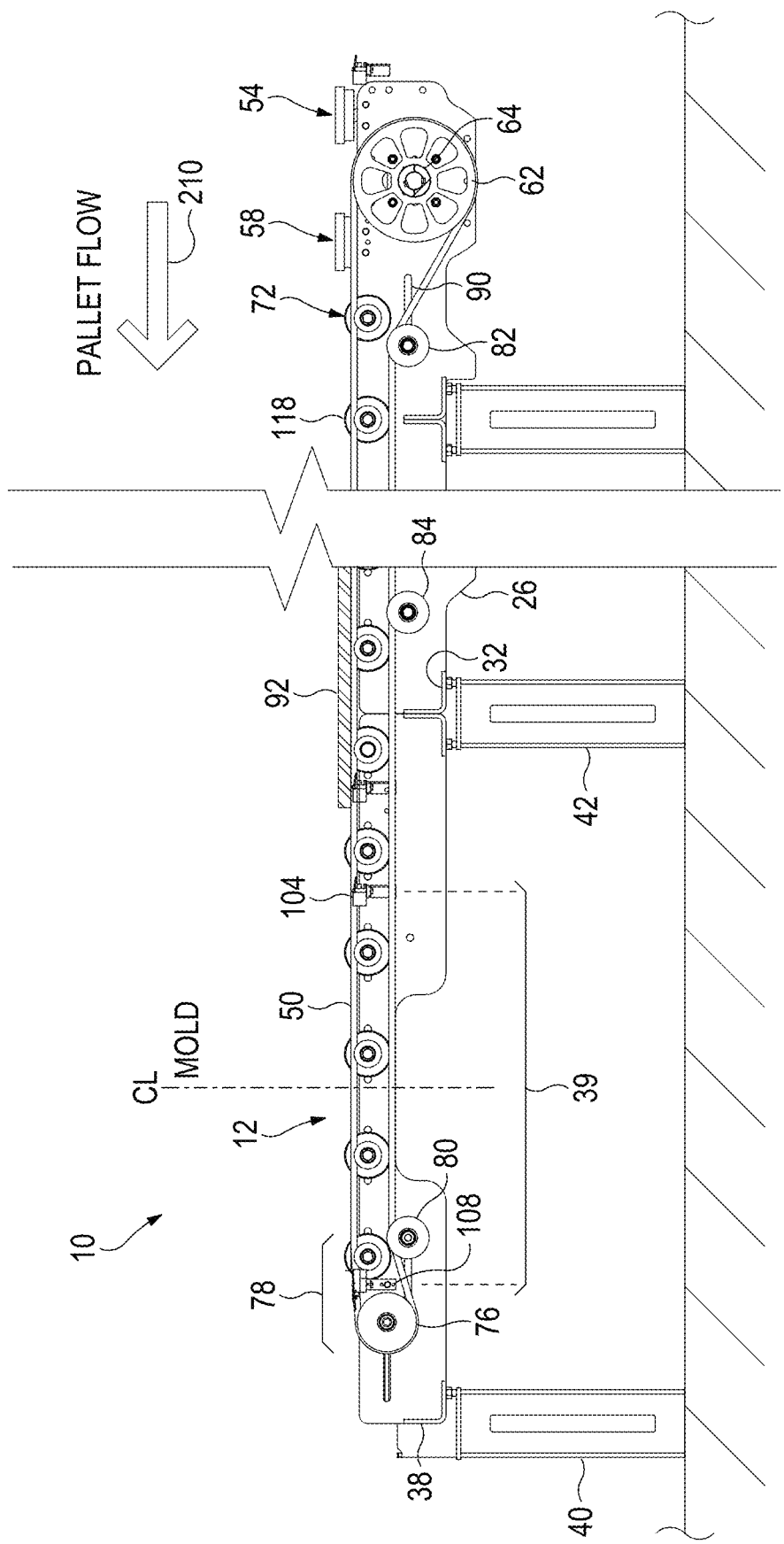
FIGS. 7A-7E are plan views of the pallet load and staging area of the pallet feeder assembly of FIG. 3 at progressive positional movements of the pallets according to teachings of the invention.
Figure 7B:
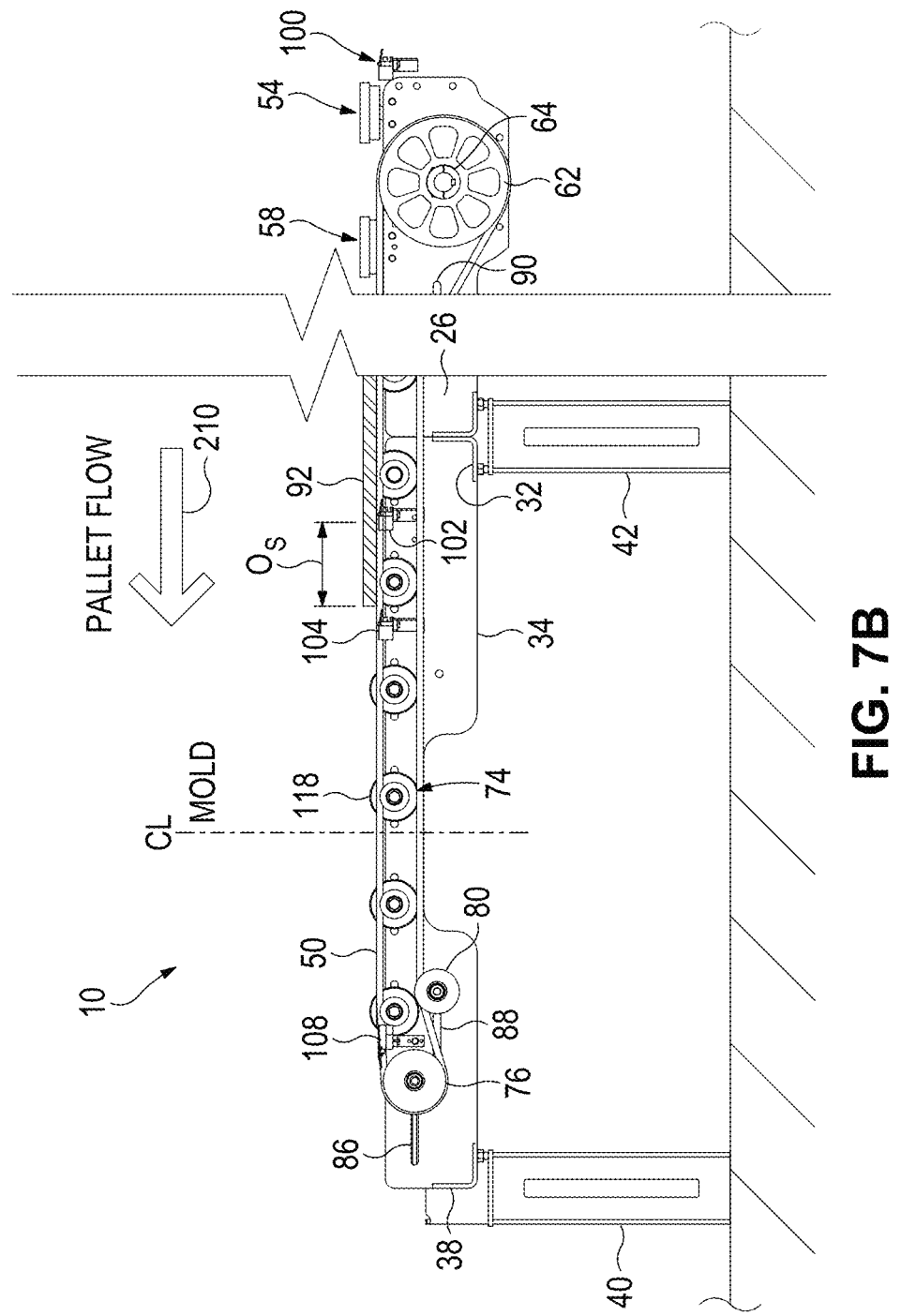
Figure 7C:
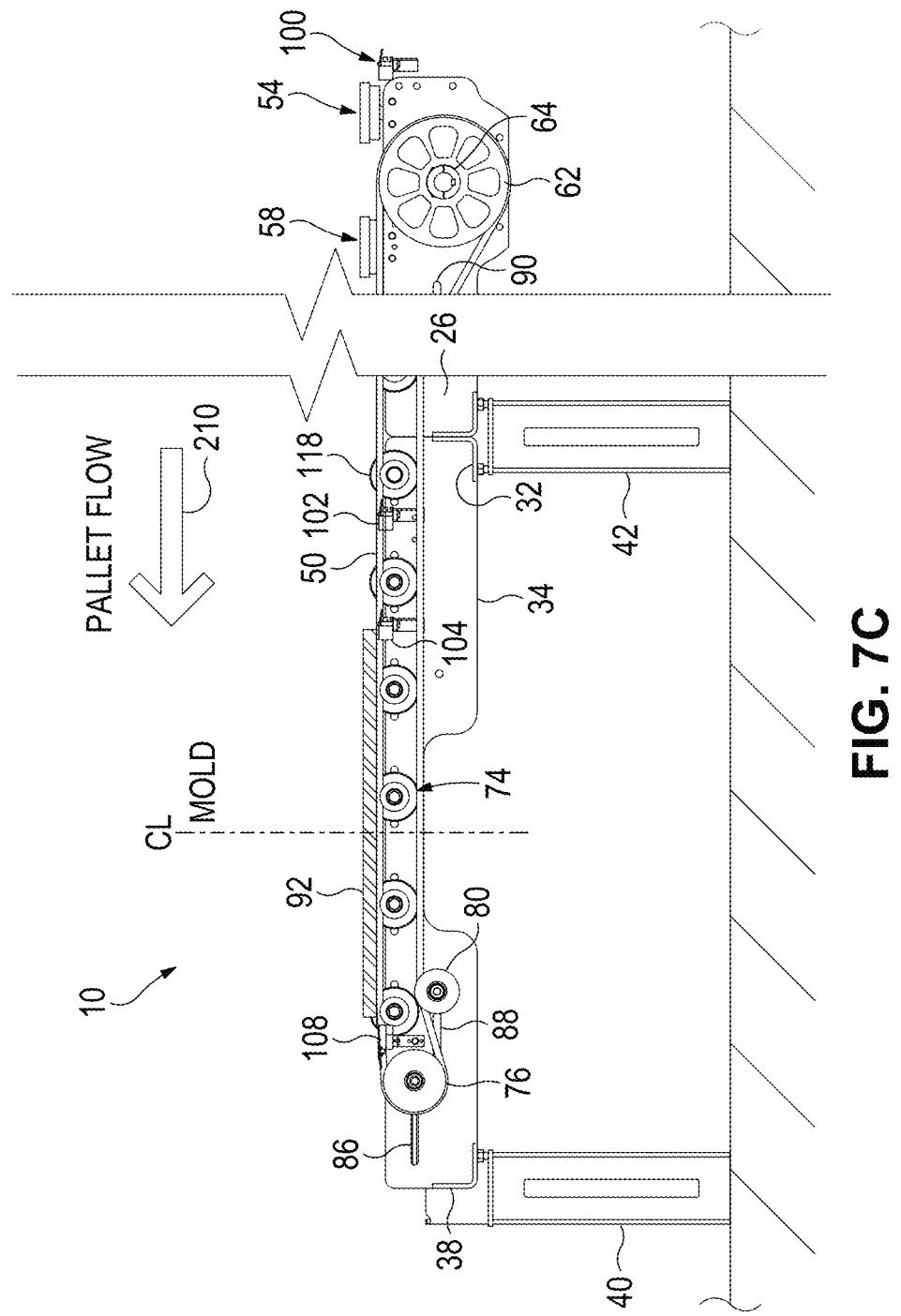
Figure 7D:
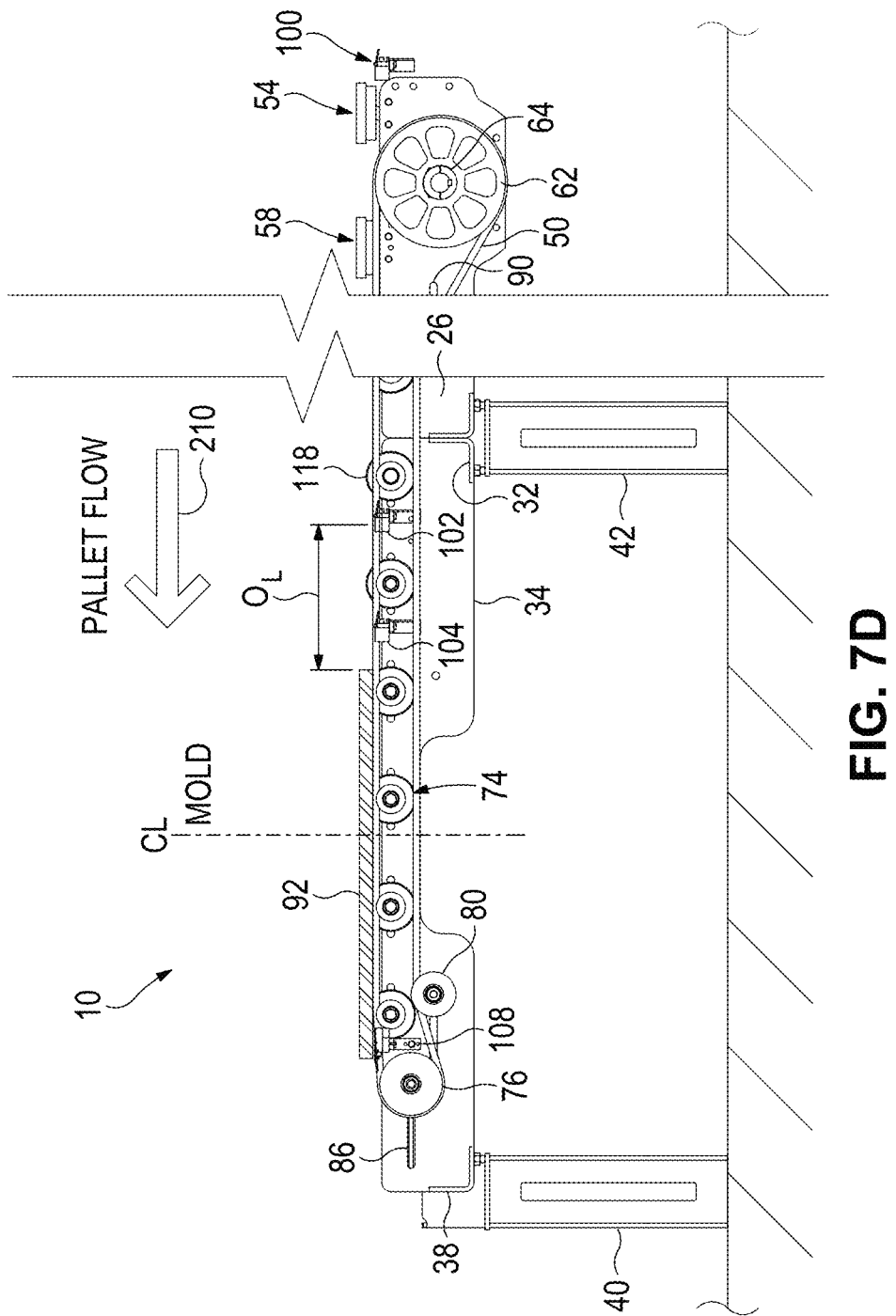
Figure 7E:
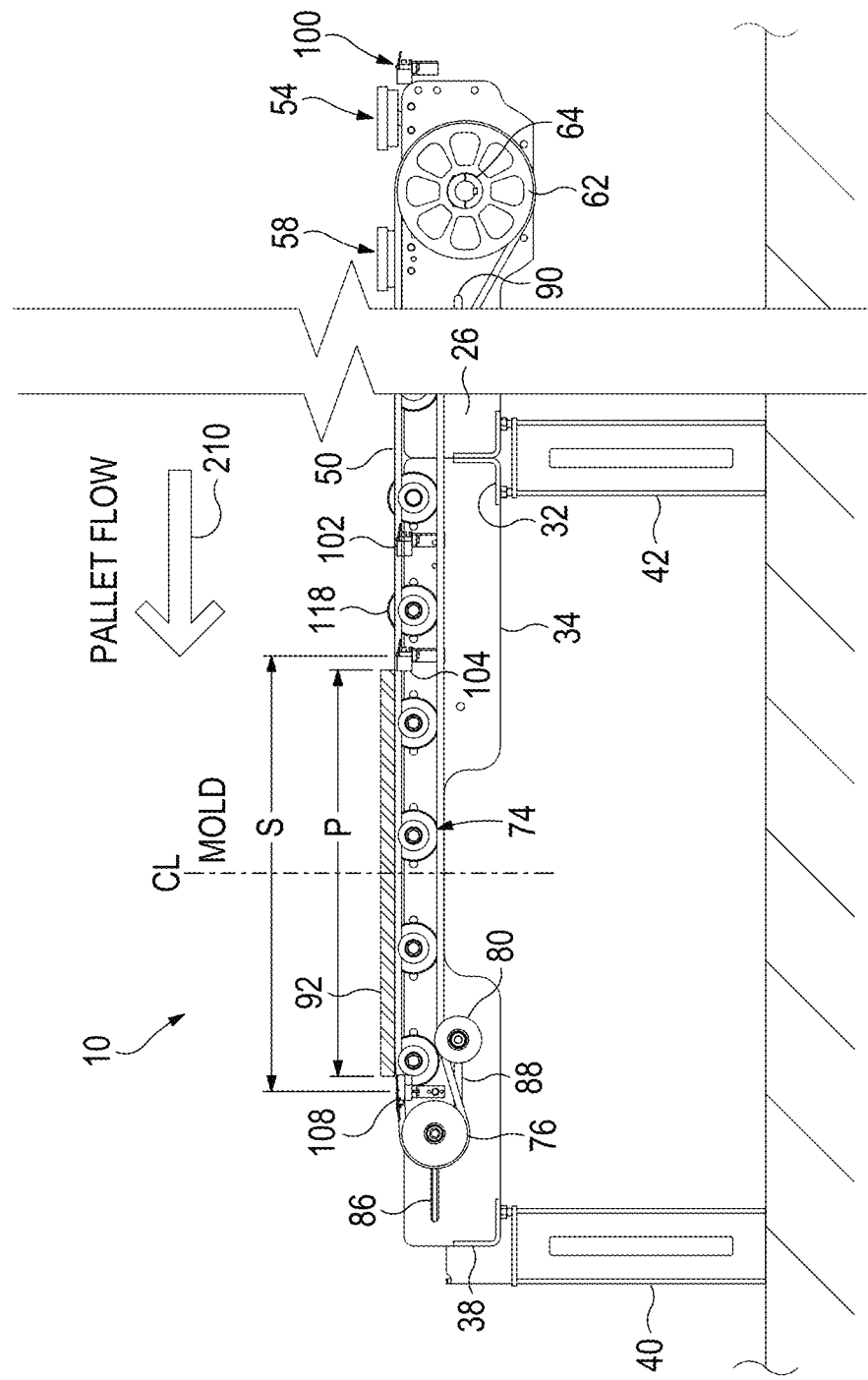
Figure 10:
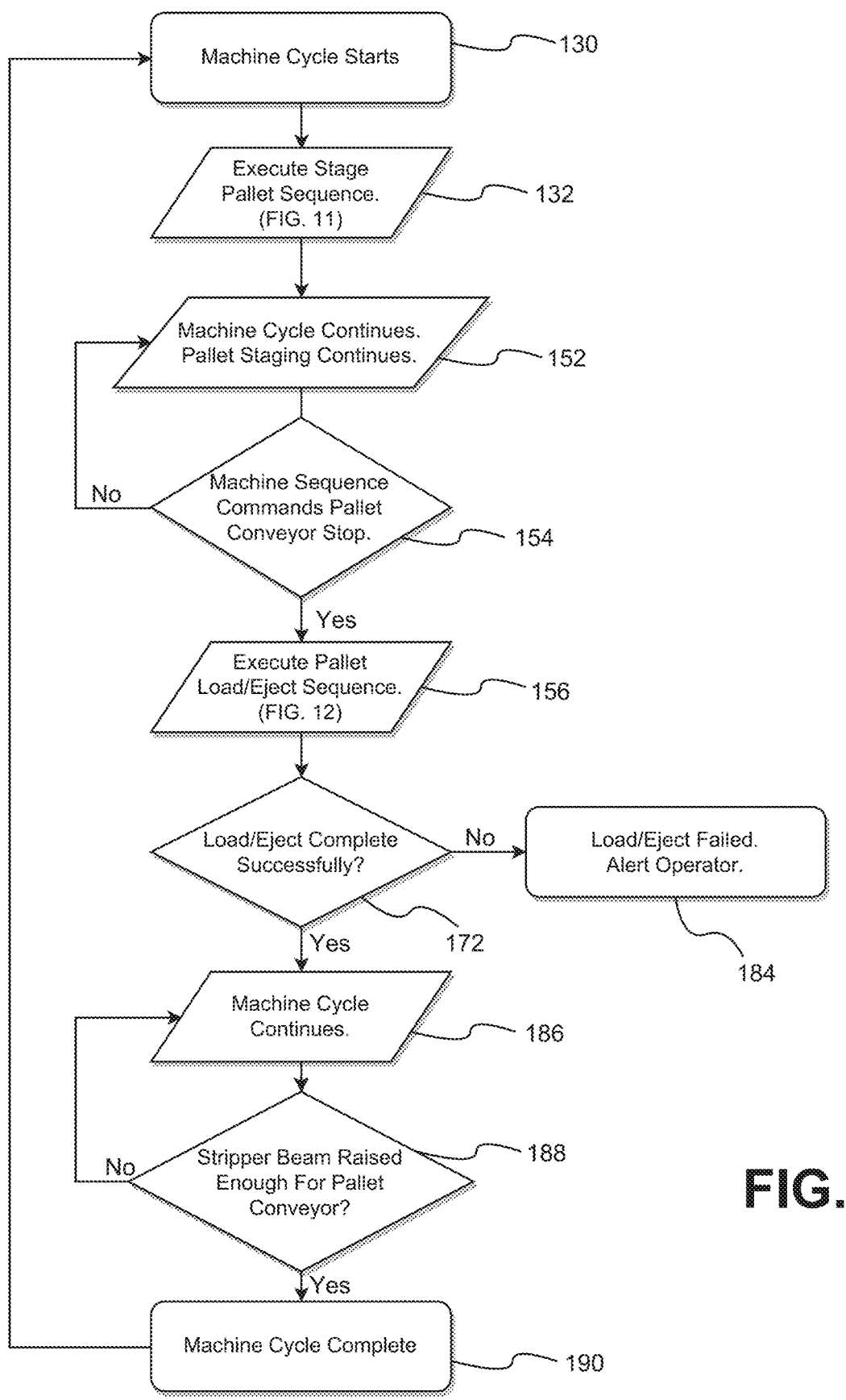
FIG. 10 is a flow diagram illustrating the process steps of an exemplary machine cycle of the pallet feeder assembly according to teachings of the invention.
Figure 11:
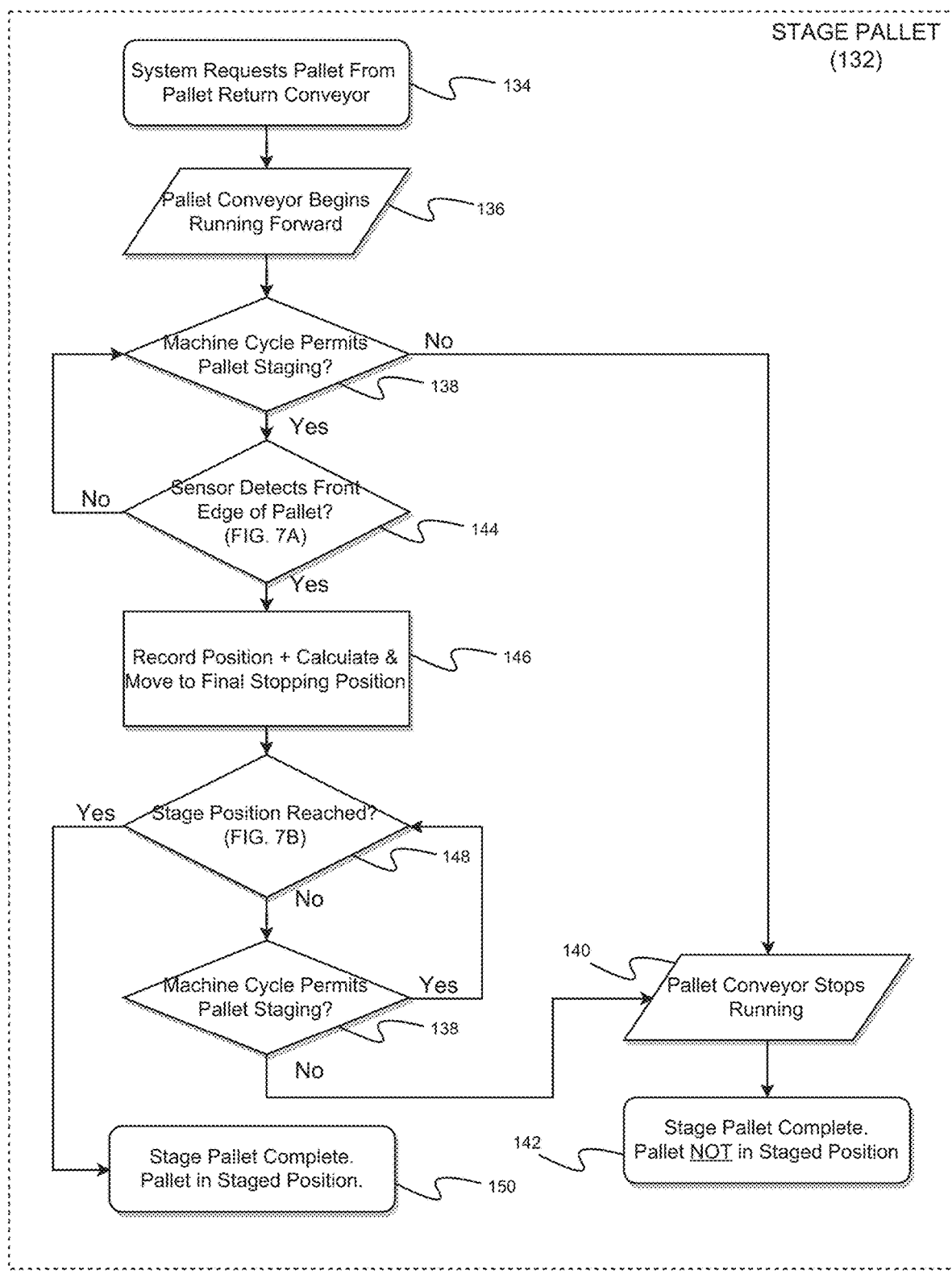
FIG. 11 is a flow diagram illustrating the process steps of an exemplary pallet staging sequence of the pallet feeder assembly used in the machine cycle process of FIG. 10.
Figure 12:
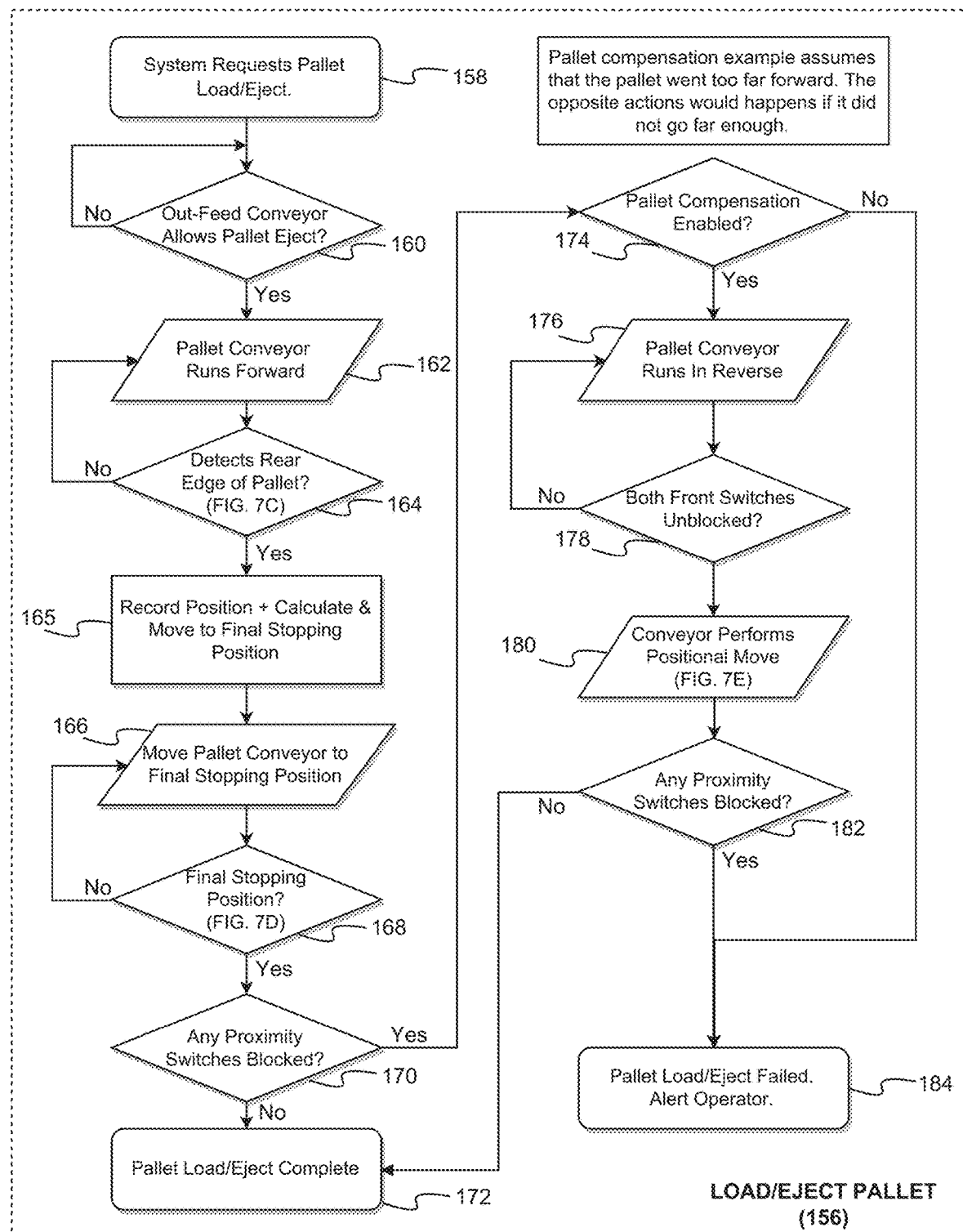
FIG. 12 is a flow diagram illustrating the process steps of an exemplary pallet load/eject sequence of the pallet feeder assembly used in the machine cycle process of FIG. 10.

FIGS. 7A-7E illustrate various stages of the pallet feeder assembly 10 during an operation cycle of the CPM 300 and pallet feeder assembly 10 according to process steps illustrated by the flow diagrams of FIGS. 10-12. Specifically, FIG. 7A illustrates a staged pallet 92 crossing the front edge of sensor 102, FIG. 7B illustrates the staged pallet moved a desired offset amount $O_s$ past sensor 102 to a proper staged position, FIG. 7C illustrates a pallet moved so that rear edge just passes upstream load/unload expanse sensor 104, FIG. 7D, illustrates a pallet move to an overshoot position so that it just covers downstream load/unload expanse sensor 108, and FIG. 7E illustrates a pallet correctional move upstream to a desired load point midway between sensors 104 and 108.

Turning also to FIG. 10, the production cycle starts at block 130 where the conveyor 12 is empty of pallets 92 as shown in FIG. 1. The process then proceeds to the stage pallet sequence of block 132, which operates the subroutine illustrated in the flow diagram of FIG. 11.

Pallet staging is the process of moving a production pallet 92 entering the upstream end 18 of the pallet feeder assembly 10 to a point just upstream of the load/unload zone 14 (e.g. "staged position"). Having a pallet 92 in the staged position allows minimal delay in providing the next pallet to the CPM 300 during a subsequent production cycle. In this way, CPM production cycles can occur more quickly so that more molded products are produced in the same amount of time. For the staging of a pallet 92, a stage pallet subroutine 132 is performed in which the system requests a pallet from the in-feed conveyor 200 in block 134. Responsive to this request in block 134, computer 114 transmits a signal to drive motor 68 in operation block 136 so that the pallet conveyor 12 begins running forward. Query block 138 operates to determine whether the machine cycle is set to permit pallet staging. If not, then operation proceeds to block 140 in which the conveyor 12, via a de-power instruction to drive motor 68, stops running. The stage cycle 132 then ends in block 142 with a pallet not in a staged position.

If instead the query block 138 determines that a pallet staging operation is permitted as by operator selection at computer 114, then operation proceeds to block 144 to detect a front edge 93 of pallet 92 via staging sensor 102 as shown in FIG. 7A. Block 144 moves production pallet 92 forward from in-feed conveyor 200 onto the upstream end 18 of conveyor 12, an action detected by sensor 100. A normally open contact on sensor 100 is used to detect a production pallet 92 entering the rear of the conveyor 12 via in-feed conveyor 200 as shown in FIGS. 5-6. Once the production pallet 92 is fully past sensor 100 (e.g. by detecting both leading and falling edges of the pallet 92), the system ends its current request for a production pallet 92 from in-feed conveyor 200 and forward movement of in-feed conveyor 200 stops. Detection of the production pallet by sensor 100 is used to snap-shot a present position of the production pallet 92 on the conveyor 12 to determine if it reaches staging sensor 102 in an allotted time period. Should the allotted time period or conveyor travel be exceeded, an alarm condition will ensue notifying the operator.

Forward operation of the conveyor 12 by drive motor 68 continues until detection of the front edge 93 of pallet 92 by sensor 102 in block 144. Upon detection in block 144, the process proceeds to block 146 in which the servo drive registers the exact production pallet 92 position on the conveyor 12 and sends the position and proximity switch 102 status to programmable logic controller (PLC) 112. PLC 112 sees that the front edge 93 of production pallet 92 was detected and calculates a target position for the production pallet 92 and pallet feeder assembly conveyor 12. The target position consists of the pallet feeder assembly conveyor position when the front edge of the production pallet was detected and a staged offset spacing $O_s$ that is set by the machine operator through a human-machine interface such as through computer 114, via display 116. This target position allows the control system to consistently position the front edge 93 of pallet 92 in the same staged location, e.g. a staged offset $O_s$ downstream from sensor 102 (see, e.g. FIG. 7B), regardless of the pallet feeder conveyor staging velocity or deceleration rate.

Once the target position is calculated, the servo drive 68 executes a positioning move of the pallet feeder assembly conveyor 12 in block 148 until the proper staging position is achieved. The staging of pallet 92 is then considered complete in block 150 and the pallet feeder process continues to block 152 (FIG. 10) and thence to block 154 where the pallet conveyor 12 stops.

The process then proceeds to the load/unload sequence in block 156 as embodied in the subroutine shown in FIG. 12. The load/unload sequence runs when CPM 300 is in need of a pallet 92 to raise up against a mold box 314 as shown in FIG. 2; this triggers block 158 where the system requests a pallet for load/eject. If an out-feed conveyor (not shown) is configured to allow pallet eject in block 160, then operation proceeds to block 162 where the conveyor 12 is run forward to convey the pallet 92 downstream according to motion profiles preselected by the machine operator as will be described below with respect to FIGS. 8-9. Staged pallet 92 is then moved forward on conveyor until the rear of the pallet is detected by sensor 102 in query block 164 as shown in FIG. 7C.

Upon detection of the rear edge 95 of pallet 92, operation proceeds to block 165 in which the servo drive registers the back (i.e. falling) edge of the production pallet and sends the position and proximity switch status to the concrete products machine PLC 112. PLC 112 sees that the back edge 95 of the pallet 92 was detected and calculates a target position for the production pallet and production pallet feeder conveyor 12 position. This target position consists of the pallet feeder assembly conveyor position when the back edge of the production pallet was detected (FIG. 7C) and a load position offset $O_L$ determined by the machine operator by entry through the HMI, e.g. via entry into computer 114. Once the target position is calculated, the servo drive executes a position move in block 166 to that pallet feeder assembly conveyor 12 position. Once this move is complete via query block 168, the CPM control system checks the status of the four proximity switches surrounding the pallet table load/unload position 14 in query block 170—e.g. sensors 104, 106, 108, 110—to determine whether any of the sensors are blocked. If all four sensors 104, 106, 108, 110 are clear (e.g. no pallet detected) the production pallet 92 is assumed to have been correctly positioned along the centerline CL of the mold box 314 mounted within CPM 300. If properly positioned, operation proceeds to block 172 in which the load/eject sequence is complete and the automated production cycle of the CPM continues until molded product is extruded from the mold cavities onto the production pallet 92.

If one or more of the proximity switches 104, 106, 108, 110 detect a pallet—as shown in FIG. 7D where the pallet is moved too far forward as might happen from slippage of the pallet on belts 50, 52 during a pallet deceleration—then the process proceeds to a correction operation begun in query block 174 where a pallet compensation is performed if such compensation is enabled by the machine operator. In such a compensation, a calculation is performed based on the length P of the pallet and the distance S between sensors 102 and 108. A correction operation is run in block 176 in which the conveyor 12 is run in reverse to move pallet 92 backward upstream by half of the difference between the distance between sensors and the pallet length, or ½*(S−P), with a slow (with unique motion parameters) incremental positioning move so that the pallet (ideally) is now between sensors 102 and 108 as shown in FIG. 7E. Query block 178 checks to determine whether any of the downstream sensors 108, 110 are covered as the conveyor 12 performs the position move in block 180. If PLC 112 determines that none of the sensors 104, 106, 108, 110 are blocked after the correction operation, query block 182 then proceeds to block 172 where the load/unload sequence is complete. If, on the other hand, PLC 112 determines that a sensor is still blocked, then the machine operator is alerted in block 184 that the load/eject sequence has failed. Failure can occur if the pallet is misaligned on the conveyor 12, if the pallet has an irregular, nonrectangular shape or the pallet is sized too large. In any case, the machine operator can then manually remove the misshapen pallet and then continue the production process. Alternately, if after the first correction operation is performed and the upstream sensors 104, 106 detect the presence of the production pallet 92, then a second compensation operation can be performed in which the pallet is moved forward by the same or a smaller correction increment.

The above process is the preferred method for correcting pallet 92 position on a conveyor 12 of a type having a pallet length P between an upstream and downstream end and a length S of a load/unload expanse 14 within which the pallet is properly positioned for use in a molded products production cycle. The method comprises disposing sensors 104, 106 immediately upstream and sensors 108, 110 immediately downstream of the load/unload expanse 14, with each of the sensors configured to detect the presence of the pallet immediately adjacent the respective sensor. After stop of the pallet 92 on the conveyor 12, the process detects whether the pallet 92 is immediately adjacent any one of sensors 104, 106, 108, or 110. If the pallet 92 is immediately adjacent to or block the sensors, then the automated position correction operation is performed on the conveyor such that the pallet 92 is moved until it is no longer adjacent to any of the sensors. This correction is preferably performed by calculating a difference between the length P of the pallet and the distance S between upstream and downstream sensors. Instructions are then sent via PLC 112 to the conveyor 12, e.g. to motor 68, to move the pallet half the calculated difference downstream if the sensor triggered by pallet 92 is one of the upstream sensors pair 104, 106, otherwise sending instructions to the conveyor to move the pallet half the calculated difference upstream if the covered sensor is a downstream sensor 108, 110.

Upon successful completion of the load/unload sequence and position correction (if needed), the machine production cycle continues in block 186 where the production pallet 92 is properly positioned at the horizontal center CL of the mold 314 and directly over the load/unload expanse 14 of the conveyor assembly 10. The CPM cycle starts, as shown in FIG. 2, by then raising the machine stripper beam 310 up through the open portion 39 defined within the conveyor 12 along the load/unload expanse 14. As the stripper beam 310 raises, it contacts the underside of pallet 92 and thereby lifts it off of the belts 50, 52 until it contacts the underside 318 of mold box 314. Once the pallet 92 is lifted against the underside 318 of the mold box 314 as in block 188 (FIG. 10), another production pallet is moved forward from the in-feed conveyor 200 onto the pallet feeder conveyor 12 and continues forward to the staged position immediately behind the load/unload expanse 14. FIG. 3 shows staged pallet 92b in relation to the lifted pallet 92a, and a pallet 92c yet remaining on the in-feed conveyor. Once the CPM cycle has completed and the production pallet, e.g. pallet 92a with newly formed concrete products, lowers back onto the belts 50, 52 of the conveyor 12, the assembly 10 moves forward both the production pallet 92a with the molded product and the empty pallet 92b in the staged position at the same time. This simultaneous movement allows the production pallet 92a to exit the pallet feeder assembly 10 onto the out-feed conveyor (not shown) where the pallet may be stacked and the product cubed, while at the same time positioning the staged pallet 92b forward to the horizontal center CL of the mold position within the load/unload expanse 14 of the conveyor 12. This completes one cycle of the CPM (e.g. block 190), which is then repeated continuously during a production run.

As part of the automated machine cycle of the system, pallet staging only operates in a particular part of the machine cycle. That is, the production pallet staging begins after the CPM stripper beam 310 moves up and is no longer on a 'stripper beam down decel' proximity switch (not shown). This assures that the pallet table on the stripper beam 310 has raised far enough through opening 39 to have lifted the production pallet off the pallet feeder assembly conveyor 12.

Figures 8, 9:
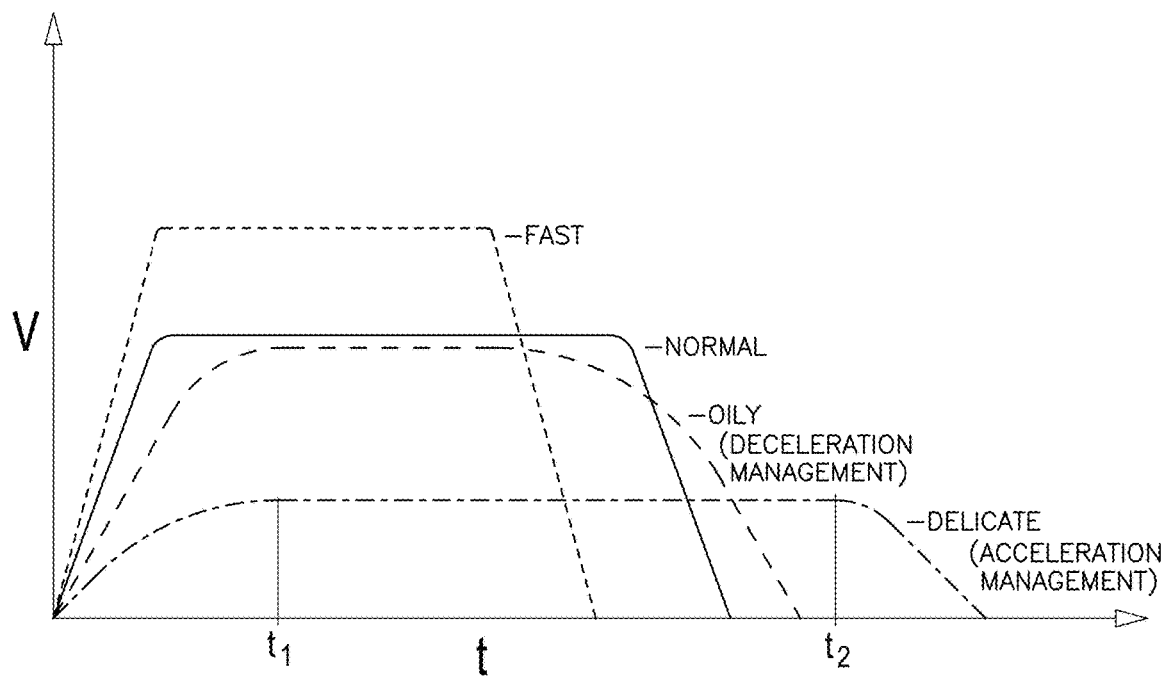
FIG. 8 illustrates an exemplary screen shot of a pallet feeder assembly move profile graphic user interface allowing designation and selection of various move profiles according to teachings of the invention.
FIG. 9 is a graph illustrating the resulting move profiles of pallets on the pallet feeder assembly according to the input values inserted into the interface of FIG. 8.

FIG. 8 illustrates an exemplary operator interface screen implemented on computer 114 and displayed on display 116. The computer 114 is programmed with a plurality of operator selectable motion profiles—here: fast, normal, oily, and delicate—that include instructions for operating servo motor 68 at different rates of speed, acceleration and deceleration rates, and jerk settings (i.e. rates of change of acceleration/deceleration). The values displayed for each of the motion profiles can be preprogrammed, but may also be changed if desired by the machine operator.

The motion profiles are configured to address varying conditions that may exist within a production cycle. The system allows selection of one of the plurality of motion profiles by the machine operator as by touching one of the four virtual buttons displayed on the upper right of the touch sensitive user interface screen 116.

FIG. 9 illustrates in graphical form the plurality of motion profiles as velocity over time whereby the slope is the acceleration rate and the sharpness of the transition between the sloped line and the constant velocity is the 'jerk' rate, also known as the change in acceleration/deceleration. A high slope means a large acceleration/deceleration rate, while a sharp transition means a large jerk rate. In contrast, a lower slope means slower acceleration/deceleration and a more rounded transition means that jerk (e.g. rate of change of acceleration/deceleration) is much more gradual. For instance, a 'fast' motion profile has a high acceleration/deceleration rate, a high velocity, and high jerk rate as evident by its sharp transitions between acceleration/deceleration and constant velocity. The 'normal' motion profile is much like the 'fast' motion profile except with lower accel/decel, final velocity, and jerk rates and thus takes longer to complete a production cycle movement. The 'oily' motion profile is more gradual still, with an exaggeratedly low decel jerk rate to prevent slippage of oily pallets during movement on the conveyor belts 50, 52. And the 'delicate' motion profile is more gradual still, and takes the most amount of time to complete a production cycle movement because of its very low jerk and acceleration rate, low final velocity, and low deceleration rate. These motion profile rates are noted in FIG. 8 and shown in the Table below:

TABLE 1

| Motion Profile Settings | | | | |
|---|---|---|---|---|
|  | Normal | Oily | Fast | Delicate |
| Load/Eject - Speed (%) | 80 | 75 | 100 | 50 |
| Load/Eject - Accel (%) | 15 | 15 | 18 | 5 |
| Load/Eject - Decel (%) | 20 | 10 | 25 | 20 |
| Load/Eject - Accel Jerk (%) | 100 | 80 | 100 | 50 |
| Load/Eject - Decel Jerk (%) | 30 | 20 | 30 | 30 |

For instance, the 'fast' motion profile may be selected if the pallets exhibit little or no slip when moved on the conveyor belts 50, 52 during a production cycle and that the molded products that are carried away during an eject sequence are rigid or resilient and not damaged by large acceleration forces.

The 'oily' motion profile may be selected if the pallets 92 exhibit a great amount of slip when carried on belts 50, 52 due to their oily surface. In this case, deceleration management implements an S-curve change in deceleration whereby the pallet would gradually come to a stop during a staging movement or movement to the load/unload expanse 14. By implementing such gradual change in movement when coming to a stop, the oily pallet stands less chance of slipping on the belts 50, 52 and thus more accurate positioning of the pallet can be achieved.

The 'delicate' motion profile may be selected if particularly delicate molded products are being carried away from the load/unload expanse 14 of conveyor 12 to the outfeed conveyor. Such products might be tall, uncured concrete products with a high center of gravity, or other products that might break, bend, slump or lose their structural integrity when exposed to high motion forces such as large changes in acceleration. Accordingly, the 'delicate' motion profile includes acceleration management whereby the acceleration jerk setting is the lowest of all the motion profiles, and that the acceleration rate is set extremely low. Additionally, both the speed, and deceleration rate and jerk are relatively low compared to a 'normal' motion profile. For deceleration, an appropriate move profile is chosen that will result in the shortest overall load/eject time without causing the pallet to slip on the pallet conveyor. Pallet slip can often lead to mispositioning on the conveyor 12 and thus triggering of the position correction subroutine where even a small compensation can roughly add about 0.5 seconds to the load/eject completion time.

In practice, and referring to the 'delicate' motion profile graph in FIG. 9, the computer 114 instructs servo motor 68 to very gradually come up to a maximum acceleration rate of 5% and then very gradually lowering this acceleration rate until reaching a speed rate of 50% at time $t_1$. This 50% speed rate is maintained until time $t_2$, whereupon the motor is instructed to somewhat gradually raise the deceleration rate up to 20% and then lower it to achieve a gradual stop. The S-curve used to calculate this gradual increase/decrease in acceleration/deceleration is created from a non-adjustable equation and/or set of equations embedded within drive 115 (FIG. 13) based on requested speed and accel/decel.

The 'normal' motion profile achieves a compromise between the 'fast' profile and the 'oily' and 'delicate' profiles by having medium speeds, acceleration and deceleration rates, and jerk rates and is programmed to be used in most situations.

Jerk is the rate of change of acceleration/deceleration. Adjusting the jerk term adjusts the sharpness of the corners between the constant velocity phase of the movement and the acceleration and deceleration phases. A lower jerk rate results in a more gradual S-curve, whereas a higher jerk rate results in a sharper (e.g. more trapezoidal) corner in the motion profile graphs in FIG. 9. Acceleration management is important when the operator cares most about the freshly formed product on the ejecting pallet. For deceleration management, the operator is primarily concerned about the empty loading pallet not slipping when stopping.

Other selectable elements within the operator interface screen 116 of FIG. 8 include virtual buttons located in the bottom right of the interface screen to allow an operator to select whether a pallet conveyor compensation step (e.g. query block 174 in FIG. 12) is enabled. Furthermore, each of the values set for the various motion profiles can be changed by touching that number on the touch sensitive screen 116 and typing in a new one. Finally, manual movement settings may be changed within the lower left virtual buttons to set desired speed, accel/decel, and jerk rates.

These settings allow an operator to implement a new method for moving pallets 92 on a conveyor 12 between upstream and downstream ends 18, 20. The method comprises allowing selection of one of the plurality of displayed motion profiles by a machine operator, where each of the motion profiles are preset to include at least an operation speed, a deceleration rate, and an acceleration rate. Responsive to selection of the desired motion profile by the machine operator, the selected motion profile is implemented on a pallet conveyor assembly 10 of a type described above, e.g. including a servo motor 68 for moving belts 50, 52 on the conveyor configured to support and transport a pallet 92 thereon. The process for implementing the selected motion profile includes the steps of accelerating the servo motor 68 by the acceleration rate up to the operation speed of the selected motion profile such that the pallet on the conveyor moves at or near that rate and speed. Responsive to a detected position—e.g. when sensor 102 detects a leading edge 93 of pallet 92—the process automatically decelerates the servo motor 68 by the deceleration rate from the operation speed down to zero so that the pallet stops on the conveyor at or near a desired position, e.g. at offset $O_s$ past sensor 102.

Additional aspects of this conveyor movement via motion profiles allows the selected one of the plurality of motion profiles to have a different acceleration rate and deceleration rate from the other potentially selectable motion profiles. Furthermore, each of the motion profiles may have at least one difference in operation speed, deceleration rate, or acceleration rate from other motion profiles within the plurality of displayed motion profiles. Additionally, the plurality of motion profiles each may also include a preset jerk rate defined as a rate of change of acceleration or deceleration, whereby the step of accelerating and decelerating includes gradually moving up to the acceleration rate and deceleration rate according to the preset jerk rate.

As explained above, multiple pallets may be simultaneously moved by the selected motion profile. For instance, after a production cycle has been completed where the production pallet 92a, loaded with molded product, is placed back down onto the conveyor 12 from the production zone 304, a staged pallet 92b may be moved from a staged position on the conveyor to a load/unload position on the conveyor. Movement of the staged pallet 92b can occur while the production pallet 92a is simultaneously moved from the load/unload position toward the downstream end of the conveyor using the selected one of the plurality of motion profiles. And as shown in FIG. 8, these motion profiles may be selected from a plurality of preset motion profiles using a graphic user interface.

Having described and illustrated the principles of the invention in a preferred embodiment thereof, it should be apparent that the invention can be modified in arrangement and detail without departing from such principles. For instance, it is understood that the pallet feeder assembly can be used for products outside of the concrete molded products industry where accurate and flexible speed and position control is important. Accordingly, we claim all modifications and variation coming within the spirit and scope of the following claims.

What is claimed is:

1. A pallet feeder assembly for use with a concrete products machine, the assembly comprising:
    a conveyor having a load/unload expanse configured to be disposed below a production zone, a staging expanse upstream of the load/unload expanse, an upstream end adapted to be positioned behind the concrete products machine, and a downstream end adapted to be positioned in front of the concrete products machine;
    a plurality of sensors disposed along a length of the conveyor including sensors disposed upstream and downstream of the load/unload expanse, the sensors operative to detect a presence of a pallet on the conveyor adjacent the sensors;
    transport means on the conveyor for moving a pallet loaded on the transport means between the upstream end and downstream end of the conveyor and including a pair of spaced belts running the length of the conveyor and coupled to motorized servo controls for moving the belts parallel to an axis of movement of the conveyor;
    a computer interface configured to display a plurality of movement profiles for selection by an operator and operating the motorized servo controls according to a selected one of the movement profiles responsive to inputs received from the plurality of sensors; and
    an open portion within the load/unload expanse configured to admit a lifting means for raising the pallet from the transport means up into the production zone against an underside of a mold box supported within the concrete products machine and back down onto the transport means during a production cycle of the concrete products machine.

2. The pallet feeder assembly of claim 1, wherein the plurality of sensors includes sensors adjacent to each of the pair of spaced belts.

3. The pallet feeder assembly of claim 1, wherein the transport means further includes a plurality of belt guides disposed on either right or left sides along the length of the conveyor and on which the pair of spaced belts are carried, each of said belt guides having a guide flange that extends upward for rolling contact with the pallet as the pallet is carried on the belts past the belt guides.

4. The pallet feeder assembly of claim 1, wherein the plurality of sensors includes a stage-begin sensor positioned adjacent an upstream end of the conveyor and configured to detect a leading edge of a pallet moved onto the conveyor.

5. The pallet feeder assembly of claim 4, wherein the plurality of sensors includes a stage-end sensor positioned downstream of the stage-begin sensor and configured to detect a leading edge of a pallet moved along the transport means.

6. The pallet feeder assembly of claim 1, further including a pallet alignment means disposed adjacent the upstream end of the conveyor and including a first set of guide wheels disposed on either side of the conveyor with rolling contact surfaces that are separated apart approximately a width of the pallet.

7. The pallet feeder assembly of claim 6, wherein the guide wheels further include upper surfaces having a larger diameter than the rolling contact surfaces.

8. The pallet feeder assembly of claim 6, wherein the pallet alignment means further includes a second set of guide wheels disposed on the conveyor downstream of the first set and having rolling surface aligned with the rolling contact surfaces of the first set coaxial with a direction of travel on the conveyor.

9. The apparatus of claim 1, wherein the sensors are configured to detect the presence of the pallet immediately adjacent the sensor and the motorized servo controls are configured to perform a position correction operation on the conveyor such that the pallet is moved by a correction amount so that the pallet is no longer immediately adjacent to any of the sensors.

10. The apparatus of claim 9, wherein the correction amount is half a calculated difference between a length of the pallet and a distance between sensors positioned at the upstream end and downstream end of the conveyor.

\* \* \* \* \*